(12) United States Patent
Kaku

(10) Patent No.: US 7,472,134 B2
(45) Date of Patent: Dec. 30, 2008

(54) IMAGE DISTRIBUTING SYSTEM

(75) Inventor: Toshihiko Kaku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 189 days.

(21) Appl. No.: 09/864,456

(22) Filed: May 25, 2001

(65) Prior Publication Data
US 2002/0049728 A1 Apr. 25, 2002

(30) Foreign Application Priority Data
Jul. 3, 2000 (JP) .............................. 2000-201548

(51) Int. Cl.
G06F 7/00 (2006.01)
G06F 17/00 (2006.01)
G06K 9/00 (2006.01)
G06K 9/54 (2006.01)
G06K 9/60 (2006.01)

(52) U.S. Cl. .................... 707/104.1; 382/103; 382/122; 382/305

(58) Field of Classification Search ............... 707/1–10, 707/100–104.1, 200–205; 715/501.1, 511–513, 715/756, 733; 345/762, 726, 418–419, 522; 725/61, 135, 104, 133, 141–142; 705/25–27; 382/190–196, 198, 132, 282, 42, 47–48, 382/55, 276, 305, 173, 103, 122; 348/232, 348/233, 333.02, 169, 14.08, 211.2–211.4, 348/14.14, 559, 722, 135, 143, 152–155; 358/450–453, 1.15, 1.18; 438/257; 396/50, 396/52, 56–59, 153, 310, 322; 340/937
See application file for complete search history.

(56) References Cited

U.S. PATENT DOCUMENTS

| | | | | |
|---|---|---|---|---|
| 5,553,609 A | * | 9/1996 | Chen et al. | 600/301 |
| 5,563,722 A | * | 10/1996 | Norris | 358/453 |
| 5,568,406 A | * | 10/1996 | Gerber | 702/159 |
| 5,675,358 A | * | 10/1997 | Bullock et al. | 345/420 |

(Continued)

FOREIGN PATENT DOCUMENTS

CA 2563478 * 10/2005 .................... 7/26

(Continued)

OTHER PUBLICATIONS

Rainer et al., Capturing interactions in meetings with omnidirectional cameras 8 pages.*

(Continued)

*Primary Examiner*—John E Breene
*Assistant Examiner*—Joshua Bullock
(74) *Attorney, Agent, or Firm*—Sughrue Mion, PLLC

(57) ABSTRACT

An image distributing system for distributing an image in which a certain objected character is caught, having a camera system capturing images in which a person who is the objected character is caught; a signal transmitter connecting to the camera system; an image database connecting with the signal transmitter and storing a plurality of image data transmitted by the signal transmitter; a character information database for storing character information for identifying the person caught in the image as the objected character; and an image collecting unit, identifying a person caught in the image, data of which is stored in the image database, as the objected character, and collecting image data in which the objected character is caught.

100 Claims, 24 Drawing Sheets

U.S. PATENT DOCUMENTS

| | | | | |
|---|---|---|---|---|
| 5,694,514 | A * | 12/1997 | Evans et al. | 386/46 |
| 5,740,267 | A * | 4/1998 | Echerer et al. | 382/132 |
| 5,745,126 | A * | 4/1998 | Jain et al. | 382/154 |
| 5,806,072 | A * | 9/1998 | Kuba et al. | 707/200 |
| 5,850,352 | A * | 12/1998 | Moezzi et al. | 345/419 |
| 5,917,958 | A * | 6/1999 | Nunally et al. | 382/276 |
| 5,946,444 | A * | 8/1999 | Evans et al. | 386/46 |
| 6,018,774 | A * | 1/2000 | Mayle et al. | 709/250 |
| 6,031,935 | A * | 2/2000 | Kimmel | 382/173 |
| 6,035,323 | A * | 3/2000 | Narayen et al. | 709/201 |
| 6,064,398 | A * | 5/2000 | Ellenby et al. | 345/633 |
| 6,080,063 | A * | 6/2000 | Khosla | 463/42 |
| 6,081,206 | A * | 6/2000 | Kielland | 340/937 |
| 6,084,510 | A * | 7/2000 | Lemelson et al. | 340/539.13 |
| 6,095,650 | A * | 8/2000 | Gao et al. | 351/227 |
| 6,111,571 | A * | 8/2000 | Summers | 715/756 |
| 6,122,409 | A * | 9/2000 | Boggs et al. | 382/276 |
| 6,166,729 | A * | 12/2000 | Acosta et al. | 345/719 |
| 6,238,337 | B1 | 5/2001 | Kambhatla et al. | 600/300 |
| 6,249,316 | B1 * | 6/2001 | Anderson | 348/333.05 |
| 6,260,021 | B1 * | 7/2001 | Wong et al. | 705/2 |
| 6,313,875 | B1 * | 11/2001 | Suga et al. | 348/211.99 |
| 6,351,556 | B1 * | 2/2002 | Loui et al. | 382/164 |
| 6,359,643 | B1 * | 3/2002 | Visvanathan et al. | 348/14.14 |
| 6,538,689 | B1 * | 3/2003 | Chang | 348/159 |
| 6,549,913 | B1 * | 4/2003 | Murakawa | 707/104.1 |
| 6,567,121 | B1 * | 5/2003 | Kuno | 348/211.3 |
| 6,587,596 | B1 * | 7/2003 | Haeberli | 382/283 |
| 6,591,068 | B1 * | 7/2003 | Dietz | 396/429 |
| 6,606,411 | B1 * | 8/2003 | Loui et al. | 382/224 |
| 6,608,650 | B1 * | 8/2003 | Torres et al. | 348/333.02 |
| 6,609,135 | B1 * | 8/2003 | Omori et al. | 707/104.1 |
| 6,636,259 | B1 * | 10/2003 | Anderson et al. | 348/211.3 |
| 6,639,998 | B1 * | 10/2003 | Lee et al. | 382/103 |
| 6,804,684 | B2 * | 10/2004 | Stubler et al. | 707/104.1 |
| 6,807,294 | B2 * | 10/2004 | Yamazaki | 382/135 |
| 7,085,402 | B2 * | 8/2006 | Lee et al. | 382/103 |
| 2002/0188602 | A1 * | 12/2002 | Stubler et al. | 707/3 |
| 2003/0018974 | A1 * | 1/2003 | Suga | 725/86 |
| 2003/0084065 | A1 * | 5/2003 | Lin et al. | 707/104.1 |

FOREIGN PATENT DOCUMENTS

| | | | | |
|---|---|---|---|---|
| EP | 0593183 | * | 4/1994 | 15/70 |
| EP | 1045586 | * | 10/2000 | 7/15 |
| EP | 1077414 A2 * | | 2/2001 | 17/30 |
| JP | 04-071068 A | | 3/1992 | |
| JP | 05-161064 A | | 6/1993 | |
| JP | 07-193646 A | | 7/1995 | |
| JP | 08-077479 A | | 3/1996 | |
| JP | 09-294222 A | | 11/1997 | |
| JP | 10-215434 A | | 8/1998 | |
| JP | 10-224773 A | | 8/1998 | |
| JP | 10-243269 A | | 9/1998 | |
| JP | 11-258688 A | | 9/1999 | |
| JP | 2000-23015 A | | 1/2000 | |
| JP | 2000-137722 A | | 5/2000 | |
| WO | WO 98/28053 | * | 7/1998 | |
| WO | WO 03/038680 A2 * | | 5/2003 | 17/30 |

OTHER PUBLICATIONS

Suresh K choubey et al. "generic and fully automatic content based image retrieval architecture",Internatinal symposium on methodologies for intelligent systems, 1997, 12 pages.*

William M Newman et al., "performance targets, models and innovation in interactive system design", no date, 7 pages.*

Yihong Gong et al. "an image database system with content capturing and fast image indexing abilities", multimedia computing and systems, 1994. pp. 121-130.*

BHKim et al. "locatization of a mobile robot using images of a moving target", proceedings of the 2001 IEEE international conference on Robotics and automation, May 2001, pp. 253-258.*

Yiming Ye et al. "tracking a person with pre-recorded image database and a Pan, tilt, and zoom camera", proceedings IEEE workshop on visual surveillance, 1998, pp. 10-17.*

Cai,Q et al. Tracking human motion in structured environments using a distributedcamera system, IEEE transactions on Pattern Analysis and Machine Intelligence, Nov. 1999, vol. 21, issue: 11; pp. 1241-1247.*

D.J. Taylor et al. "The integration of digital camera derived images with a computer based diabetes register for use in retinal screening", computer methods and programs in biomedicine 62 (200) pp. 157-163.*

Yiming Ye et al. "tracking a person with pre-recorded image database and a pan, tilt, and zoom camera", proceedings 1998 IEEE workshop on visual surveillance, 1998, pp. 10-17.*

JPA 2000-201558 (Dec. 5, 2006 Office Action).
JPA 2000-201558 (Mar. 6, 2007 Office Action).
JPA 2000-201548 (Apr. 24, 2007 Office Action).
JPA 2004-104951 (Apr. 24, 2007 Office Action).
JPA 2004-104952 (Apr. 24, 2007 Office Action).

* cited by examiner

CHARACTER DB 110

| CHARACTER ID | FRIEND ID | CHARACTER INFORMATION | | ENTRY TIME | POSITION INFORMATION | RESTRICTION FOR OTHERS NOT TO OBTAIN ONE'S IMAGE |
|---|---|---|---|---|---|---|
| | | DATA AT ENTRY | UPDATE DATA | | | |
| 1 | 4, 5 | FACE PARAMETER (1) | NO | 9:00 | 9:10=POINT A | YES |
| 2 | 3 | FACE PARAMETER (2) | UPDATED FACE PARAMETER (2) | 9:15 | 9:30=POINT B, 10:00=POINT C, ... | NO |
| 3 | 2 | FACE PARAMETER (3) | NO | 9:20 | 9:30=POINT B, 10:00=POINT C, ... | NO |
| | | | | | | |
| | | | | | | |

FIG. 3

IMAGE DB 120

| IMAGE ID | IMAGE CAPTURING PROPERTY ||| IDENTIFIED CHARACTER ID |||||
| --- | --- | --- | --- | --- | --- | --- | --- | --- |
| | CAMERA ID | POSITION INFORMATION ||||||||
| | | PLACE | TIME | | | | | |
| 1 | 5 | POINT A | 10:00 | 1 | | | | |
| 2 | 6 | POINT A | 10:01 | 2 | 3 | | | |
| 3 | 1 | POINT B | 10:03 | 8 | 13 | | | |
| | | | | | | | | |
| | | | | | | | | |

*FIG. 4*

IMAGE SET DB 130

| SET IMAGE ID || IMAGE ID |||||
| --- | --- | --- | --- | --- | --- | --- |
| ANGLE SET | CHRONOLOGICAL SET | | | | | |
| A1 | | 11 | 12 | 13 | 14 | 15 |
| A2 | | 6 | 7 | 8 | | |
| | T1 | 15 | 17 | 20 | 24 | |
| | | | | | | |
| | | | | | | |

*FIG. 5*

95:CHARACTER IDENTIFYING UNIT

| SET IMAGE ID | IMAGE ID |
|---|---|
| A1 (ANGLE SET) | 11  12  13  14  15 |

INCLUDES CHARACTER X
IN COMMON

THE CHARACTER X IN IMAGE ID 11 IS
IDENTIFIED AS CHARACTER ID 19

THE CHARACTER X IN IMAGES ID 12 THROUGH 15 IS ALSO
IDENTIFIED AS CHARACTER ID 19

95: CHARACTER IDENTIFYING UNIT

| SET IMAGE ID | IMAGE ID |
|---|---|
| T1 (CHRONOLOGICAL SET) | 21  22  23  24  25 |

INCLUDES CHARACTER Y IN COMMON (22 through 25)

THE CHARACTER Y IN IMAGE ID 21 IS IDENTIFIED AS CHARACTER ID 29

THE CHARACTER Y IN IMAGES ID 22 THROUGH 25 IS ALSO IDENTIFIED AS CHARACTER ID 29

DETECT POSITION OF A CHARACTER

↓

THE CHARACTER COMES TO A PREDETERMINED POSITION

↓

CAPTURE IMAGE

INFORMATION FOR SETTING IMAGE SELECTING CONDITION

PLEASE INPUT YOUR ID NUMBER
[ 215 ]

SEARCH CONDITION (PLEASE CHECK)

- [✓] ONLY YOURSELF
- [✓] WITH YOUR FRIEND
  PLEASE INPUT YOUR FRIEND'S ID
  [ 216 ] [ 217 ]
- [✓] FACIAL EXPRESSION
  - [✓] EYES OPEN ONLY    [✓] SMILING ONLY

[ SEARCH ]

*FIG. 14*

INFORMATION FOR BROWSING COLLECTED IMAGES AND SELECTING OUTPUT SETTING

THERE ARE ○○ IMAGES MATCHING TO YOUR CONDITION
PLEASE SELECT PURCHASING IMAGES

WHICH MEDIUM DO YOU OUTPUT ON?
- ☐ PAPER   ☐ MD
- ☑ CD-R    ☐ ON THE WEB   ☐ ATTACHED TO E-MAIL

☐ 5 ☐ IMAGES ARE PURCHASED FOR ☐ 50 ☐ YEN.

PURCHASE

*FIG. 15*

POSITION INFORMATION DB

| CHARACTER ID | 1 | 230 |
|---|---|---|

| TIME | PLACE |
|---|---|
| 13:00 | POINT A |
| 13:10 | POINT A |
| 13:20 | POINT B |
| 13:30 | POINT B |
| ⋮ | |

320: CHARACTER IMAGE RECOGNIZING UNIT

IMAGE DETECTING CONDITION
- CONDITION FOR DELETING IMAGE
  - EYES ARE CLOSED
  - FACIAL EXPRESSION IS ANGRY

| ○ DETECT<br>× DELETE | ○ | × | ○ | × |
|---|---|---|---|---|
|  |  |  |  |  |
|  | IMAGE1 | IMAGE2 | IMAGE3 | IMAGE4 |

IMAGE DISTRIBUTING SYSTEM

This patent application claims priority from a Japanese patent application No. 2000-201548, filed on Jul. 3, 2000, the contents of which are incorporated herein by reference.

BACKGROUND OF THE INVENTION

1. Field of the Invention

The present invention relates to an image distributing system. More particularly, the present invention relates to an image distributing system which distributes images in which a certain individual or target character is present to the character themselves.

2. Description of the Related Art

People who visit an amusement park take pictures at various places and times in the amusement park for souvenirs. The pictures are usually taken with a camera that is owned by a person visiting the park. The character who wants to be pictured stops and positions themselves, and ask someone else to take a picture. When a group of people go to an amusement facility, people in the group take pictures of one another.

Pictures are preferably taken at a place that has interesting characteristics such as an object which catches the eye in a facility. When people move along a route in a certain facility of the amusement park, pictures are taken along the route.

Conventionally, if a person wants to take a picture, the person needs to bring their own camera. The camera often is a burden to carry around while people enjoy themselves, although if no one in a group has a camera they cannot take photographs. When a person visits an amusement park, it is not easy for the person to take their own photograph. People stop, prepare themselves and then take pictures. For taking a picture, people need to interrupt their activities in the facility. Further, a target character typically poses to be photographed so that their natural facial expression and behavior is not caught in the picture. Further, the person who has the camera takes the pictures so that he or she has fewer pictures of themselves with the rest of the group. Because the person who takes the pictures has to think about timing the photographs, he or she can not fully enjoy the activities in the amusement facility.

SUMMARY OF THE INVENTION

Therefore, it is an object of the present invention to provide an image distributing system, which is capable of overcoming the above drawbacks accompanying the conventional art. The above and other objects can be achieved by combinations described in the independent claims. The dependent claims define further advantageous and exemplary combinations of the present invention.

According to a first aspect of the present invention, an image distributing system for distributing an image in which a certain objected character is caught, comprises: a camera system capturing images in which a person who is the objected character is caught; a signal transmitter connecting to the camera system; an image database connecting with the signal transmitter and storing a plurality of the image data transmitted by the signal transmitter; a character information database for storing character information for identifying the person caught in the image as the objected character; and an image collecting unit, identifying a person caught in the image, data of which is stored in the image database, as the objected character, and collecting image data in which the objected character is caught.

The image distributing system may include an image selecting terminal which shows the images thus collected to a user and prompt the user to select images from the images in which the objected character is caught. The selecting unit may distribute the image data thus selected. The image distributing system may include an outputting unit for outputting the image data collected by the image collecting unit.

The outputting unit may distribute the image data thus outputted. The system may include an image selecting terminal which shows the images thus collected to a user and prompt the user to select images from the images in which the objected character is caught, wherein the image selecting terminal transmits to the outputting unit image selection information notifying which images are thus selected. The image selecting unit may have means for capturing an image of a user who selects the images.

The image selecting terminal may further have means for verifying the person who selects the images based on the character information. The character information may be data about at least one of facial characteristic, body characteristic, and characteristic of outfits of the objected character.

The camera system may include a plurality of cameras provided within a predetermined area. The image distributing system may include a character information obtaining unit, which imports an image of the objected character to the character information database for the character information of the objected character.

The image collecting unit may identify a plurality of characters in an image data based on the character information corresponding to each of the plurality of characters.

The character information obtaining unit may have a plurality of cameras for capturing character information, the character information obtaining unit imports a plurality of images of the objected character captured from a plurality angles different from one another using the plurality of cameras for capturing character information, and the image collecting unit may identify and collect, based on the plurality of images captured from the plurality of angles, the image in which the objected character is caught from the image data thus stored in the image database.

The character information obtaining unit may update the character information when the character information is newly obtained about the objected character whose character information is already obtained.

When a person refuses to be objected, the person who refuses to be objected may register refusal to the character information database, and the image collecting unit may not collect an image when at least one of the characters caught in the image is the person who refuses to be objected.

At least one of the cameras may be movable and the mobile camera may further have a wireless transmitter. The mobile camera may be installed in a mobile facility which is an object to absorb attention of the objected character.

When the same person is caught in a plurality of images and the person is identified as an objected character in one of the plurality of images, the character identifying unit may also identify the same person in the rest of the plurality of images as the objected character. The camera system includes a plurality of cameras provided within a predetermined area.

The camera system may further have a camera group, the camera group including a plurality of cameras, each of the plurality of cameras may capture an image in which a certain person is caught from a plurality of different angles, the character identifying unit may identify, when the person in an image captured by one of the camera group is identified as a certain objected character, the same person in the rest of the images captured by the rest of the cameras included in the camera group as the same objected character.

The camera system further having a camera group, the camera group further including a plurality of cameras, each of the cameras may capture an image in which a certain person is caught at a plurality of different moments, the character identifying unit may identify, when the person in an image captured by one of the camera group is identified as a certain objected character, the same person in the rest of the images captured by the rest of the cameras included in the camera group as the same objected character.

The image collecting unit may identify a person captured in the image as the objected character substantially every time when the image is captured by the camera system. The image collecting unit may save only image data in which the objected character is caught into the image database. When the image collecting unit identifies a person caught in the image as the person who refuses to be objected substantially every time when the image is captured by the camera system, and when at least one of the persons caught in the image is identified as the person who refuses to be objected, the image collecting unit does not collect the image data in which the person who refuses to be objected is caught.

The image distributing system may include a timing detecting unit which detects a timing to capture an image in which the objected character is caught, wherein the camera system may capture an image in which the objected character is caught when the timing for capturing an image is thus detected by the timing detecting unit. The timing unit may detect, based on position information about a plurality of characters, the timing for capturing an image when a plurality of characters are at a predetermined position.

The system may prompt a person in the predetermined area to carry a transmitter for transmitting radio waves and the timing detecting unit has a receiver for receiving the radio waves, and the timing detecting unit may determine a distance between the transmitter and the receiver based on the radio waves transmitted from the transmitter, and may detect the timing to capture an image when the distance is thus determined to be a predetermined distance.

The transmitter may include one of an ID card and a cellular phone. At least one of the radio waves transmitted and received between the transmitter and the receiver may include the character information. The image collecting unit may identify a person captured in the image as the objected character substantially every time when the image is captured by the camera system. The system may prompt the person who refuses to be objected to have a transmitter.

When the image collecting unit identifies a person caught in the image as the person who refuses to be objected substantially every time when the image is captured by the camera system and when at least one of the persons caught in the image is identified as the character who refuses to be objected, the image collecting unit may not collect the image data in which the person who refuses to be objected is caught.

At least one of the radio waves transmitted and received between the transmitter and the receiver is directive. The timing detecting unit detects positions of both the objected character and an object to absorb attention of the character. The timing detecting unit may detect both the objected character and an object to absorb attention of the character in a predetermined range to be captured in an image.

The transmitting unit may transmit the image data to the image database in substantially every time an image is captured. The transmitting unit may transmit the image data to the image database in substantially every predetermined time interval.

The transmitting unit may transmit the image data to the image database when a predetermined number of images are stored in the camera system. The signal transmitter may transmit the image data to the image database when at least one of following conditions are satisfied that a predetermined number of images are stored and that a predetermined time interval has past.

The outputting unit may include at least one of a printer, a means for recording a CD-R, a means for recording an MD, a web server which offers the images thus collected, a means for sending E-mail to which the image thus collected is attached.

The system may be applied in an amusement park.

According to a second aspect of the present invention, a method for distributing an image in which an objected character is caught, comprises the following steps: registering character information of the objected character; capturing images in which a person who is the objected character is caught; storing image data of the captured images; identifying the person caught in each of the images thus stored as the objected character based on the character information; and collecting the image data in which the character is caught from the stored image data.

The method for distributing an image may include outputting the data of collected image in which the objected character is caught. The method for distributing an image may include distributing the data of image thus collected. The method for distributing an image may include a choosing step, including showing a plurality of collected images in which the character is caught to a user the system objects to distribute the image, and selecting that the system directs the user to select an image the user want to be distributed from the shown images and that the system directs the user to input information which images are to be distributed.

The method for distributing an image may include distributing the data of images thus chosen. The choosing may include limiting the user who chooses the images to the objected character himself or herself based on the character information. The choosing may include verifying the user who chooses the image as the objected character based on the character information.

The method for distributing an image may include outputting the collected image in which the character is caught, and the choosing further includes notifying that the information about selected image is notified to the outputting. The registering may import an image of the character for the character information. The registering may register data about at least one of facial characteristic, body characteristic, and characteristic of outfits of the character.

The registering may have obtaining image of the character, the obtaining captures image about at least one of face, body, and outfit of the character and reads in the image data about at least one of facial characteristic, body characteristic, and outfit characteristic of the character for the character information.

The registering may import a plurality of images about an objected character from a plurality of angles different from one another, and the identifying identifies a person caught in the image thus stored as the objected character based on the plurality of images imported as character information of the objected character.

The registering may update the character information about the objected character whose character information is already registered when new character information is obtained. When a person refuses to be objected, the person who refuses to be objected may register a refusal to be objected in the registering, and the identifying may identify the character who refuses to be objected based on the refusal thus registered, and the collecting may not collect images that at least one of the persons caught in the image is the person who refuses to be objected.

The capturing may capture images using a camera system, the camera system may include a plurality of cameras provided within a predetermined area. The capturing may capture images using a mobile camera and the mobile camera may transmit the images wirelessly. The mobile camera may be installed in an object to absorb attention of the objected character, and the capturing may capture images from the object to absorb the attention.

When a person is caught in a plurality of images and the identifying identifies the person as an objected character in one of the plurality of images, the identifying may identify the same person in the rest of the plurality of images as the objected character. The capturing may capture a plurality of images from a plurality of cameras provided within a predetermined area.

The identifying may set an image group for a plurality of images, the images included in the image group may capture the same object from different angles to one another, and the identifying, when a person caught in one of the plurality of images is identified as an objected character, may also identify the same person in the rest of the images thus captured by the camera included in the camera group as the same objected character.

The identifying may set an image group for a plurality of images, the images included in the image group may capture the same object at different moments from one another, and the identifying may also identify, when a person caught in one of the plurality of images is identified as an objected character, the same person in the rest of the images thus captured by the camera included in the image group as the same objected character.

The identifying may identify a person caught in an image as the objected character substantially every time when the image is captured. The collecting may save only image data in which the objected character is caught. When a person refuses to be objected, the registering may register refusal of the person who refuses to be objected, the identifying may identify a person caught in an image as the person who refuses to be objected substantially every time when the image is captured, and when the identifying may identify at least one of the persons caught in the image as the person who refuses to be objected, the collecting may not collect the image data if at least one of the persons caught in the image is the person who refuses to be objected. The identifying may identify a plurality of people in an image based on the character information corresponding to each of the plurality of characters.

The method for distributing an image may include timing detecting which detects timing for the capturing, and the capturing may capture the image when the timing is thus detected. The method for distributing an image may include locating a position which locates a position of the objected character based on position information of the objected character, when the locating position locates that the objected character is located at a predetermined position, the timing detecting detects the timing for capturing an image.

The method for distributing may includes transmitting which includes controlling the radio wave transmission installed on the objected character, and the timing detecting may have means for receiving radio wave which receives radio waves thus transmitted, the locating position may calculate distance between the camera system for capturing an image and the objected character based on the radio wave thus transmitted and received, and the capturing may capture an image when the distance between the camera system and the character thus calculated becomes a predetermined distance.

The timing detecting may locate positions of both the objected character and a predetermined object to be captured in an image, and the capturing may capture an image when both the objected character and the predetermined object may be located within a predetermined area where both the objected character and the predetermined object are caught in the same image.

The transmitting may transmit image data captured by the capturing to the storing substantially every time an image is captured. The transmitting may transmit image data thus captured to the storing in a predetermined time interval. The transmitting may transmit image data thus captured to the storing when the capturing captures a predetermined number of images.

The transmitting may transmit image data thus captured to the storing when at least one of the following conditions is satisfied that a predetermined number of images are stored and that a predetermined time interval has elapsed.

The outputting may include at least one of printing the image out on paper, recording the image on a CD-R, recording the image on an MD, offering the images on a predetermined URL, sending E-mail to which the image thus collected is attached.

The method for distributing an image may be applied in an amusement park.

According to a third aspect of the present invention, a business method for distributing an image in which an objected character is caught, comprises the following steps: registering character information of the objected character; capturing images in which a person who is the objected character is caught; storing image data of the captured images; collecting data of images in which the character is caught from the stored image data based on the character information thus registered; selecting, the system prompts the person to select an image the character wants to be distributed from the images thus collected; and distributing the selected image in which the character is caught based on the information about the selected image notified from the selecting.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 3 shows an example of the character information database 110.

FIG. 4 shows an example of the image database 120.

FIG. 5 shows an example of the image set database 130.

FIG. 14 shows an example of image selecting condition's information indicated on the image selecting terminal 50.

FIG. 15 shows an example of a collected image list and output setting information indicated on the image selecting terminal 50.

FIG. 20 shows an example of collecting images that a character who passes two different points is caught in.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
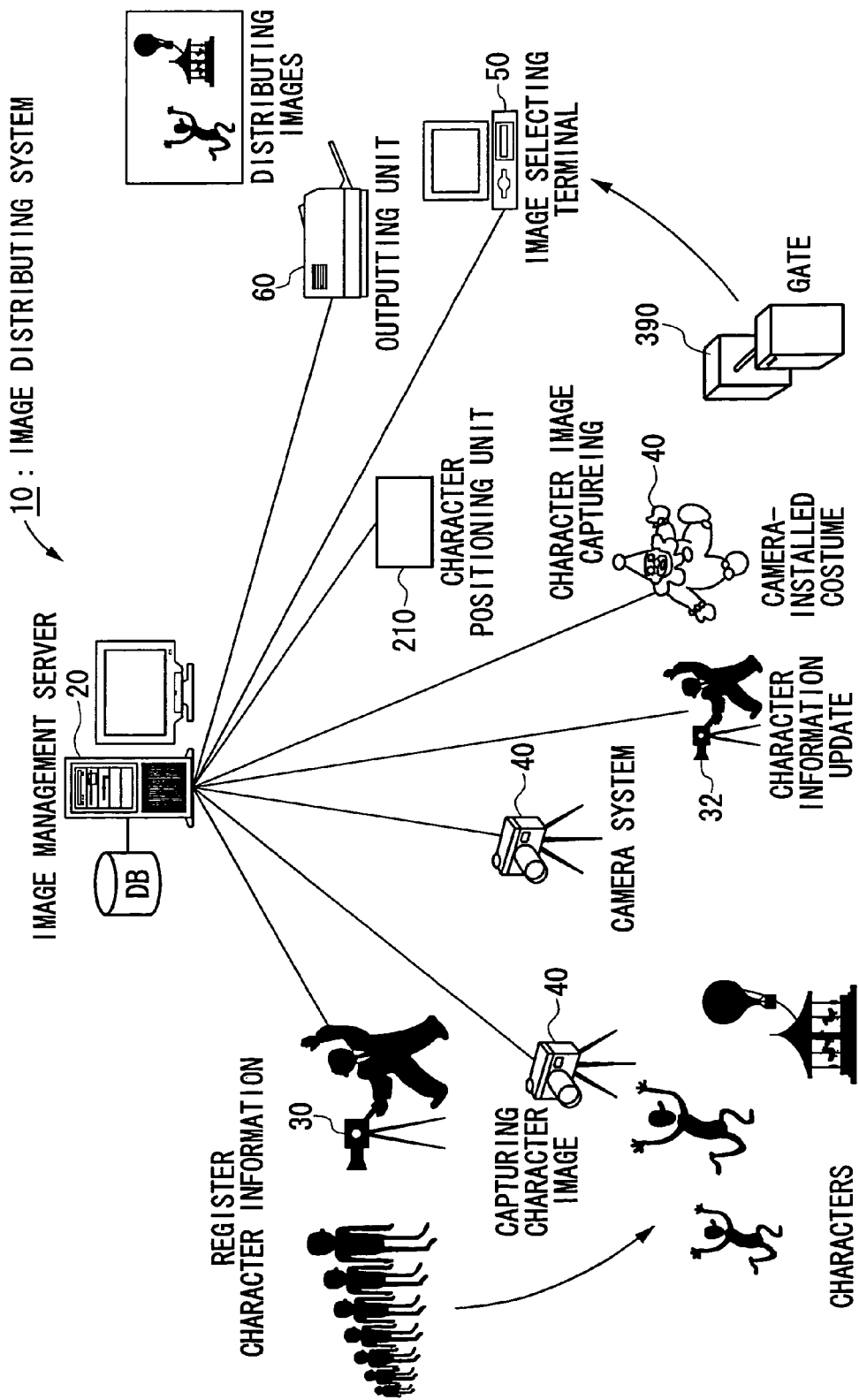
FIG. 1 shows an example of the image distributing system 10 according to an embodiment of the present invention applied in an amusement park.

FIG. 1 shows an example that the image distributing system 10 of an embodiment of the present invention is applied to an amusement park. In this embodiment, the image distributing system 10 objects or images a person who is playing in or visiting an amusement park.

The image distributing system 10 has an image management server 20, a character information obtaining unit 30, a character information updating unit 32, a character positioning unit 210, a camera system 40, a timing detecting unit 140, an image selecting terminal 50, and an outputting unit 60. First, a system constructed by the image management server 20, the character information obtaining unit 30, the character information updating unit 32, the camera system 40, the image selecting terminal 50, and the outputting unit 60 is described. A usage of a character positioning unit 210 will be described later.

The character information obtaining unit 30 obtains a character information of a characteristic such as face, body, and outfits of a character who wants to have images distributed by the image distributing system 10. The character information obtaining unit 30 is, for example, a plurality of cameras for capturing character information. The cameras for capturing character information capture images from various angles such as a head-on and a profile of the person. Another example of the character information obtaining unit 30 is a scanner for reading an image. In this case, the scanner reads a photograph attached to a driver's license, for example. In another case such that the character information is already obtained and the obtained character information is recorded in an ID card, an ID card reader for reading information recorded in the ID card is used as a character information obtaining unit 30. The ID card may be issued when the character information is registered.

The character information obtaining unit 30 has a transmitter for transmitting the obtained character information. The transmitter for the character information is, for example, a LAN included in the image distributing system 10. The LAN may include a wireless signal transmitter. The character information obtained by the character information obtaining unit 30 is transmitted to a character information database 110 in the image management server 20 using the LAN. Another example of the transmitter is a portable wireless transmitter and a cellular phone, or the wireless transmitter may be installed in an ID card issued at entrance which is described later.

Some people playing in the amusement park do not want for unspecified other people to obtain their picture image. To satisfy such people, an option is set at the registration of the character information such that only the character by themselves is allowed to obtain the image of the specific person. When entering the amusement park, every person may be prompted to choose whether he or she wants their images to be distributed or refuses to be objected. When the person wants images to be distributed in which he or she is caught, the person may set an optional restriction such that others may not obtains the images in which the registering person is caught. Using such optional settings, when another person collects the images, the images of the specific person are omitted from the collected objects. Such information about limiting the image collection is also included in the character information. The image collecting unit does not collect the images in which at least one person who refuses to be objected is caught.

If each of the persons in the amusement park has a transmitter as described later, the transmitter transmits not only character information of the each of the characters, but also transmits information that the person refused to be objected. In this case, the camera system does not capture the image in which the person who refuses to be objected is caught.

The character information updating unit 32 registers the character information again about the character whose character information is already registered. The character information updating unit 32 has a camera system for re-registration of the character information, and capturing the character information again by capturing an image of the character. The character information updating unit 32 is mainly applied in such a case that a person changes his or her appearance while playing in the amusement park, for example, he or she purchases a hat or a T-shirt and puts on the hat or the shirt. In such case, the character information registered first may not be enough to collect the image properly. Thus, using the character information updating unit 32, the character information is updated. The character information obtained by the character information updating unit 32 is transmitted to the image management server 20, and the character information in the character information database 110 is updated.

The camera system 40 include a plurality of cameras. The cameras are installed in an amusement facility. The installed cameras are preferably painted similar to the surrounding colors and patterns, so that the cameras are not easy to recognize. Thus, the character, not conscious of the camera taking a picture, has his or her image captured with ordinary action and natural facial expression. A transmitter transmits the image data captured by the camera system 40 to the image database 120. The image database 120 is provided in the image management server 20. The transmitter transmits the images captured by the camera system to the image database 120 when a predetermined number of the images are accumulated in the camera, when a predetermined time interval is past, or substantially every time the image is captured.

The camera system 40 located in the amusement facility may include a camera installed in a mobile costume that an actor wears, which is one of the attractions in the amusement park. In this case, the camera is installed in the costume such that it can not be found or seen from the outside, while the image view around (especially in front of) the costume is captured such as a natural facial expression of the person approaching the costume with interest in the costume. In this case, the camera system 40 may transmit to the image management server 20 the captured image using the wireless transmitter.

Furthermore, the camera system 40 include a camera following the predetermined specific material, for example, the above described costume, and capturing images. Using this camera, people playing with the costume and the costume are captured in an image. The camera may be set such that the camera captures images including the character, the costume, and an eye-catching object such as a water fountain, a merry-go-round, and a Ferris wheel.

Here, images captured by the camera system 40 may include a still picture and a moving image. Moving images record a series of actions of a person playing in the amusement facility, so that the images of how the person played in the amusement park may be distributed with more effect than a still picture.

Further, the camera system 40 may include a camera for character identification which is only used for identifying each person playing in the amusement park. For example, a camera for character identification is provided on a gate 390 for which an ID card for identifying the person is used. The ID card may also work as a ticket for the amusement park or a pass for entering a facility in the amusement park. The ID card may include a transmitter described in the following. The transmitter in the ID card transmits the character information about the objected character. The character information may be the information about who refuses to be objected and who registers the restriction that others not obtain his or her images. The ID card records the character information in a form of bar code, which is used at an image selecting terminal described later. When a person passes this gate 390 using the ID card, the camera system for character identification captures an image of the person who passes the gate 390 which is set on an entrance for each of the facilities in the amusement park. Thus, without being recognized by the character, the character information updating unit 32 may capture the updated character information of each character. Positions at a certain time of each character may be checked at the same time.

A region of the image captured by a camera 40 may be calculated by the direction and angle of the camera 40 when the camera 40 is fixed at a predetermined position. When the camera 40 is a mobile camera, the camera 40 may include a GPS device so that a position of the camera 40 is specified. In other case, both when the camera 40 is located in a predetermined position and when the camera 40 is mobile, the region of the captured image may be specified from the image captured by the camera 40 using image recognition of where the image is captured.

The image management server 20 stores the character information transmitted from the character information obtaining unit 30. On the other hand, the image management server 20 stores the image transmitted from the camera system 40. The image management server 20 also stores information attached to the transmitted image, for example, the position information such as when and where the image was captured, with the image.

The image selecting terminal 50 obtains conditions to collect proper images from the images stored in the image management server 20. The user may appoint or specify these conditions. Furthermore, after the collecting is executed, an image to be outputted is appointed or designated from the collected images and the outputting medium is also appointed or designated.

The outputting unit 60 outputs the image appointed or selected to output by the image selecting terminal 50 to the appointed outputting medium.

Here, the position information database 230, character information database 110, image database 120, and image set database 130 are provided in the image management server, but these servers may be provided in a database server separated from the image management server, or each of the databases may stand alone.

Next, the image distributing system 10 will be described from a viewpoint of the user of the present system.

First, a character who wants his or her image to be distributed registers character information for themselves at the character information obtaining unit 30. The registered character information is transmitted to the character information database 110 in the image management server 20. After the registration of the character information, the user plays in the amusement park without recognizing the camera system. While playing, the user has his or her image captured using the camera system 40. The user goes to an image distributing station which has the image selecting terminal 50 whenever he or she wants, selects images the user wants to purchase from the images already captured up till the moment to which the user is imaged. The collection of the images is executed based on the registered character information. The user is prompted to select favorite images from the collected images and a medium on which the image is to be outputted. Thus, the user may obtain the images caught while he or she is playing in the amusement park.

Here, the character information may be registered while playing at the amusement facility or after playing at the amusement facility. In this case, the character may collect the images themselves using the image selecting terminal 50 from images captured by the camera 40 installed in the image selecting terminal 50, and may output the collected images at once.

Figure 2:
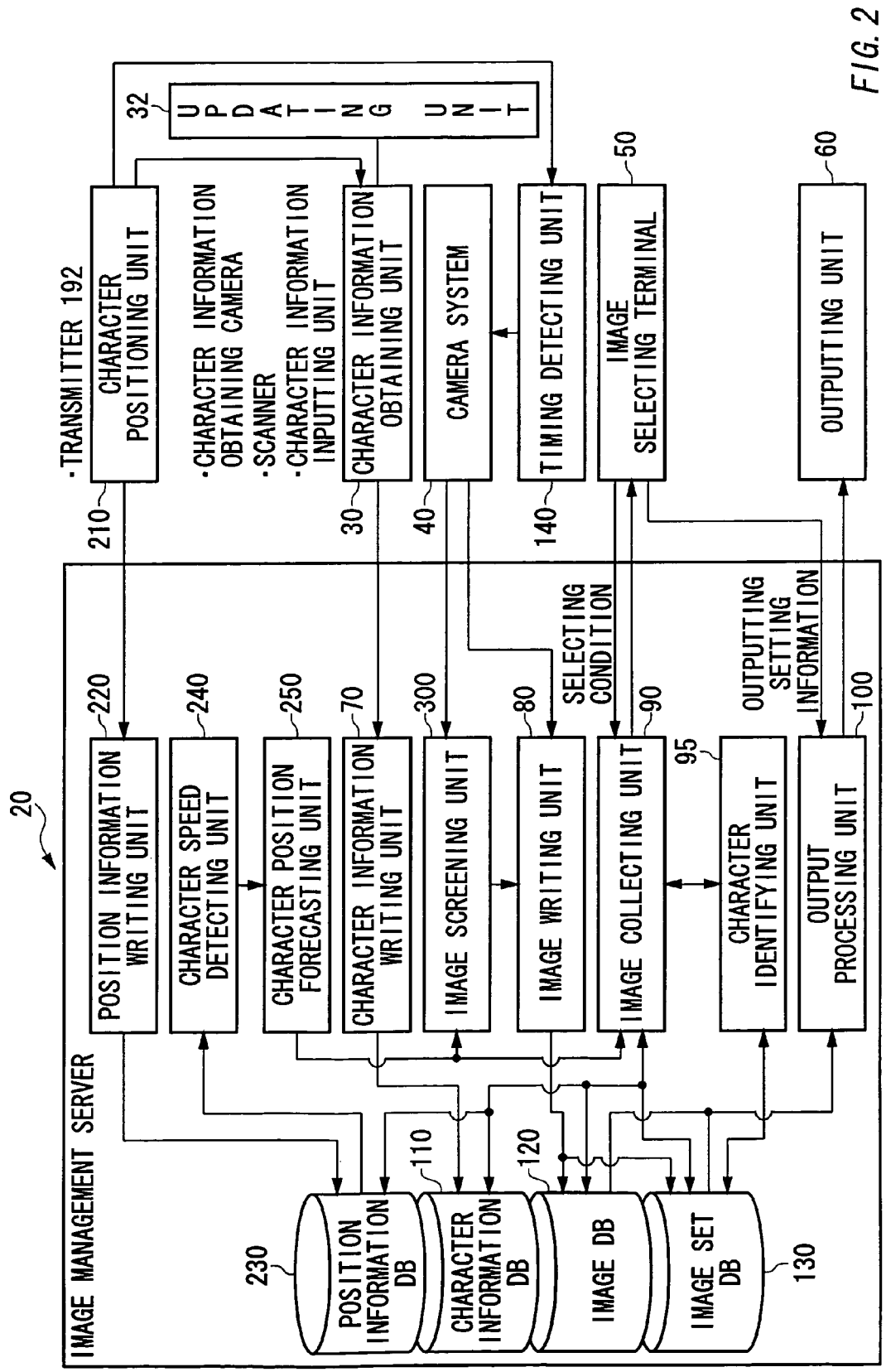
FIG. 2 shows a construction of the image management server 20.

FIG. 2 shows a construction of the image management server 20. The image management server 20 has a character information writing unit 70, an image writing unit 80, an image collecting unit 90, a character identify unit 95, a character information obtaining unit 30, an output processing unit 100, a character information database 110, an image database 120, and an image set database 130.

Further, the image management server 20 has a position information writing unit 220, a position information database 230, an object speed detecting unit 240, an object position forecasting unit 250, and an image screening unit 300 which will be described later.

The character information writing unit 70 executes a processing of receiving the character information obtained by the character information obtaining unit 30, and writing into the character information database 110.

The image writing unit 80 executes a processing of receiving the image captured by the camera system 40 and writing into the image database 120. While this process is executed, the position information of each captured image is also written into the image database 120.

The image collecting unit 90 receives a selecting condition, which includes a character ID of the character who wants to purchase images, from the image selecting terminal 50. The image collecting unit 90 executes collecting the images to be selected corresponding to the character ID included in the collect condition from the images accumulated in the image database. The character information stored in the character information database 110 is used for the collecting of the images. After the images are collected, the image collecting unit 90 transmits to the image selecting terminal 50 a result of the collecting of the images.

An output processing unit 100 outputs the selected images appointed by the image selecting terminal 50 to an appointed output medium. For example, if paper is appointed to the output medium, the output processing unit 100 executes a process of printing the appointed image on paper. In this case, the outputting unit 60 is a printer.

FIG. 3 shows an example of the character information database 110. A character ID which is assigned to each of the characters who use the image distributing system is recorded in the character information database 110. A friend ID is assigned to a friend of the character for each of the character IDs and recorded. The character ID of the friend is used later when images captured with friends are collected.

Furthermore, the character information about each of the characters obtained by the character information obtaining unit 30 is recorded in the character information database 110. The character information is information for identifying each of the characters using image recognition. For example, the character information may be described by a facial parameter into which an outline and a size of a face, or shape and size of eyes, a nose, a mouth and so on are digitized. Other than that, the character information includes information about height, physical constitution, clothing, eye glasses, and accessory for each of the characters. There are two kinds of character information, the character information as an initial data inputted for the first time and the character information as an updated data which is updated later.

Furthermore, entry time to a facility (or starting time to apply the image distributing system) is recorded for each of the characters.

On the other hand, a position of a character at a certain time is recorded as position information when the character is caught in an image captured by a camera system so that the position of the person is identified.

Each of the characters may set such limitations that an image with the character caught in sight is not collected or outputted so that no other person may obtain his or her image. Whether this limitation is set or not is also recorded in the character information database 110.

FIG. 4 shows an example of the image database 120. The image database 120 stores image data captured by a plurality of the cameras 40 included in the camera system 40 and transmitted to the image management server 20. An image ID to identify the image is allocated to each of the stored image.

Each of the images has a camera ID allocated to each of the camera capturing image and an image capturing property about the captured image such as a camera ID and the position information that is the place the image is captured and the time the image is captured. Furthermore, for each of the images, when the character already identified by the collecting unit 90 is caught in the image, the character ID of the identified character is recorded.

The image database 120 enables identification of each of the images and reference of a character caught in each of the images and information such as a position information where each of the images are captured.

FIG. 5 shows an example of the image set database 130. The image set database 130 is a database about a plurality of images catching a predetermined person. The image set database 130 is useful when a plurality of images is managed as a set rather than separately managed. There are two types for a set of images; an angle set and a chronological set. The angle set includes a plurality of images capturing objects from cameras set in a plurality of different angle and captured substantially at the same time. The other one, the chronological set includes a plurality of images capturing objects in common captured by the camera 40 as time passes. The camera capturing the characters may be a plurality of cameras.

The image set database 130 enables to manage a plurality of images when characters in common are caught in sight. The image set database 130 is used for collecting images and identifying people caught in the image.

Figure 6:
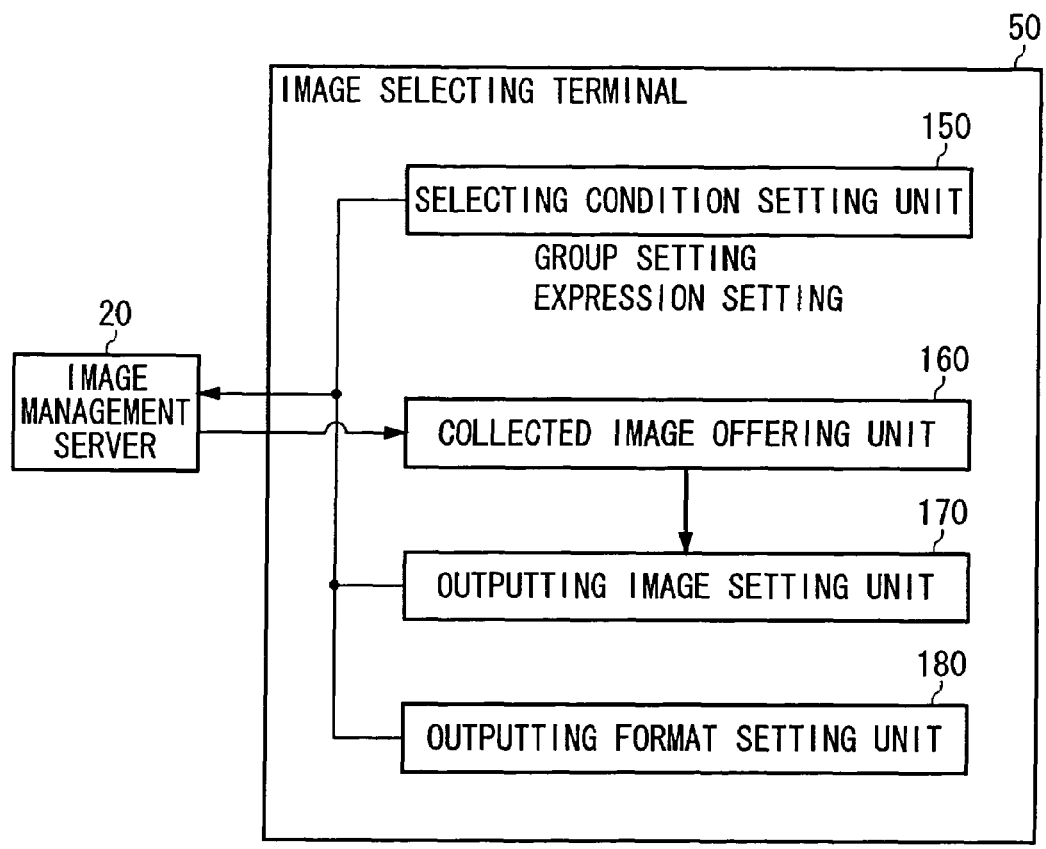
FIG. 6 shows a construction of the image selecting terminal 50.

FIG. 6 shows a construction of the image selecting terminal 50. The image selecting terminal 50 has a selecting condition setting unit 150, a collected image offering unit 160, an outputting image setting unit 170, and an outputting format setting unit 180.

The selecting condition setting unit 150 sets a selecting condition for selecting a desired image from the images stored in the image management server 20. The selecting condition is, for example, that the character is smiling or has a predetermined specific facial expression.

Further, when a group of people go to the amusement park, pictures taken with other members in the group are preferred for a souvenir. To meet this need, a selecting condition such that a plurality of people are caught in the same sight maybe set for selecting using the selecting condition setting unit 150. For example, when "images of Ms. A and I are caught in sight in common" is set for a selecting condition, the images of Ms. A and the character I which are caught in sight in common are searched based on the character information of Ms. A and the character I.

The selecting condition set in the selecting condition setting unit 150 may be transmitted to the image management server 20.

The collected image offering unit 160 receives from the image management server 20 a list of the images searched corresponding to the above described selecting condition and displays the transmitted result on a monitor to distribute for the user. When the character information is recorded on the ID card in the form of bar code and the user wears the ID card, the collected image offering unit 160 may have a bar code reader and read the character information. In other case, the collected image offering unit 160 may have a camera system and verify the user, so that the image is distributed only to the objected character themselves.

The outputting image setting unit 170 sets images appointed by the user to images to be outputted selected from the images distributed by the collected image offering unit 160.

The outputting format setting unit 180 sets a medium appointed by the user to medium on which the image is outputted. Paper, CD-R, and MD may be selected for a medium on which the image is outputted. In other case, the outputting is offering image data on the web or sending an attached file with e-mail.

The image to be outputted set at the outputting image setting unit 170 and the type of the output medium for outputting images set at the outputting format setting unit 180 are transmitted to the image management server 20.

Character identification in a set image is one of distinguishing facility included in the image management server 20. A character identification unit 190 processes character identification in a set image. This facility enables to identify a plurality of characters as a whole in case that there are a plurality of images where a character caught in images in common, when the character is identified in one of the images, the character caught in sight in common included in the rest of images in a lump. A set image includes the character in common in a plurality of images captured at the same time from a plurality of cameras having different angles (an angle set), or includes the character in common is caught in sight in a plurality of images captured in a predetermined period from a certain time (a chronological set). For each of the cases, how to identify a character will be described using FIG. 7 and FIG. 8.

Figure 7:
FIG. 7 shows processing about the angle set executed by the character identification unit 190.
Figure 7:

FIG. 7 shows a configuration of processing about the angle set executed by the character identification unit. Here, a certain angle set A1 contains the image ID 11, 12, 13, 14, and 15, and a character X (not identified yet) is caught in the images for each of the images in common. When the character X caught in the image ID 11 is identified as the character ID 19, the character Xs caught in the image ID 12 through 15 are also identified as the character ID 19 for this angle set in common.

When a plurality of people is caught in each of the images, how the person is to be identified is now described. The person in the left end of four, for example, is identified in one of images captured by camera A in an angle set S1. One of the rest of camera B included in the angle set S1 captures a group of four people. When the angle between an optical axis of the camera A and an optical axis of the camera B is less than 180 degree, the person in the left end of four is verified as the identified character. When the angle between an optical axis of the camera A and an optical axis of the camera B is 180 degree or more, the person in the right end of four is verified as the identified character. The position of person to be verified is any one of the groups, but when the number of people included in the group is odd, the center does not move, therefore it is convenient for verifying.

Thus, without identifying characters caught in the images for each of the images, the identification of characters may be executed effectively.

Figure 8:
FIG. 8 shows processing about the chronological set executed by the character identification unit 190.
Figure 8:

FIG. 8 shows a configuration of processing about the chronological set executed by the character identification unit. Here, a certain chronological set T1 contains the image ID 21, 22, 23, 24, and 25 and a character Y (not identified yet) is caught in the images for each of the images in common. When the character Y caught in the image ID 21 is identified as the character ID 29, the character Ys caught in the image ID 22 through 25 are also identified as the character ID 29 for this chronological set in common.

Thus, without identifying characters caught in the images for each of the images, the identification of characters may be executed effectively.

A camera included in the camera system 40, for example, captures images automatically in a predetermined time interval. In this case, an image without any character or an image with a character who does not register character information maybe captured. Thus, the image screening unit 300 executes a processing for selecting and deleting the images captured by the camera 40.

Figure 9:
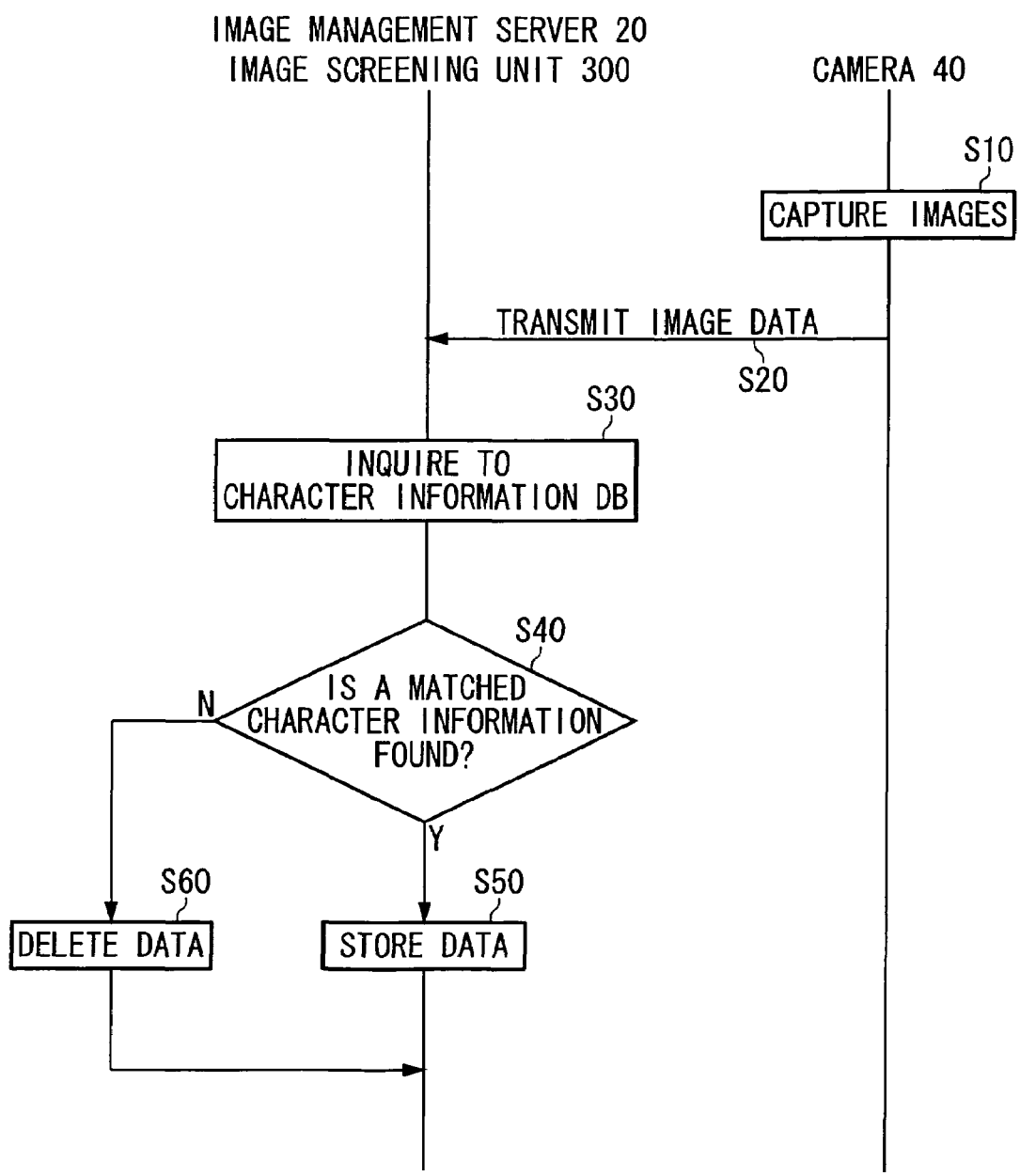
FIG. 9 is a flowchart showing the processing for selecting and deleting the images captured by the camera 40 executed by the image screening unit 300.

FIG. 9 is a flowchart showing the processing for selecting and deleting the images captured by the camera 40 executed by the image screening unit 300. First, the camera system 40 captures an image (S 10). The captured image is transmitted to the image management server 20 (S 20). The image screening unit executes the image recognition processing on the transmitted image, and verifies characters in the image to the character information registered in the character information database 110 (S 30). Whether a character who matches to the character registered in the character information is included in the image is judged by the verification (S 40). When the registered character is included in the image, the image data is saved into a database (S 50). On the other hand, the image without the registered character is deleted (S 60). This delete processing enables not to save images without registered character into the image database 120, so that load for image collecting in later may be lightened. Here, a verification degree which indicates the matching between the registered character and the character caught in the image is not limited to 100% for the condition in the verification of the character. For example, when the verification degree is 50% or more, the image is saved into the image database 120 as a candidate for the registered character. In this case, the number of saved image is increased, though a probability to miss the image in which the character is caught may be decreased.

The above described example is preferable when the character information objects to the previously registered characters. On the other hand, when the character information is obtained afterward to the image capturing, the image screening unit 300 checks if any character is caught in the image transmitted from the camera system 40. When there is at least a character is caught in the image, the image is saved. Applying this processing, without registering the character information previously, when the character information is registered afterward to the image capturing, images with character matching to the registered character information may be collected from the images with unidentified people stored in the image database 120 and set to the image selecting terminal 50 by the image collecting unit 90 or by the image identifying unit 95 when a plurality of characters are caught in a plurality of images in common. In this case, the images in which the objected character is caught is set to the image selecting terminal 50 (S 50') and rest of the images are left in the image database 120 (S 60').

If the camera system 40 captures images, for example, in predetermined time intervals without concerning a facial expression of the character, the captured image may include many images with an unwanted facial expression captured at improper timing. Improper timing not only increases the images to be searched so that the collecting needs more time, but also distributes images captured in a undesired timing for the user. Thus, it is more preferable for the camera system 40 to include a mechanism for automatically capturing images in a proper predetermined image capturing timing.

Figure 10:
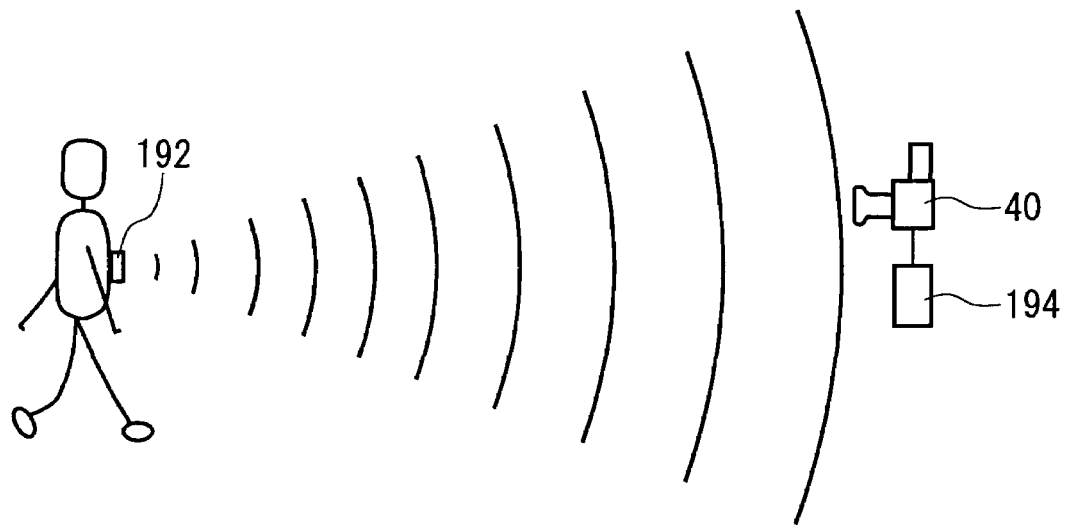
FIG. 10 shows how the position of a character is located.

FIG. 10 shows how the position of a character is located. The character has a transmitter 192 which transmits radio wave. A receiver 194 is provided in the camera system 40. The receiver 194 receives the radio wave transmitted from the transmitter 192. Distance between the character and the camera system 40 is calculated by the strength of the radio wave. When a timing detecting unit 140 detects that the calculated distance becomes a predetermined distance, the camera 40 captures an image.

At least one of the radio wave transmitted from the transmitter 192 and a region where the receiver 194 receives the radio wave preferably have directivity. The directivity enables detection of the position of the character with higher accuracy so that the timing for capturing an image is detected more properly.

The radio wave transmitted from the transmitter 192 preferably includes character information to identify the character who has the transmitter 192, so that enables an identification of a character caught in an image based on the character information included in the radio wave at the moment when the camera 40 captures the image by the detection of the radio wave. Thus, the character is identified, and the character information or the character ID of the character caught in each of the images is recorded into the image database 120. When a character is searched by the image collecting unit 90 or a character identify unit 95 described later, the image database 120 is applied. Based on the character information or the character ID of the character to be searched, the image data in which the character is caught is searched infallibly and rapidly in the image database 120.

Figure 11:
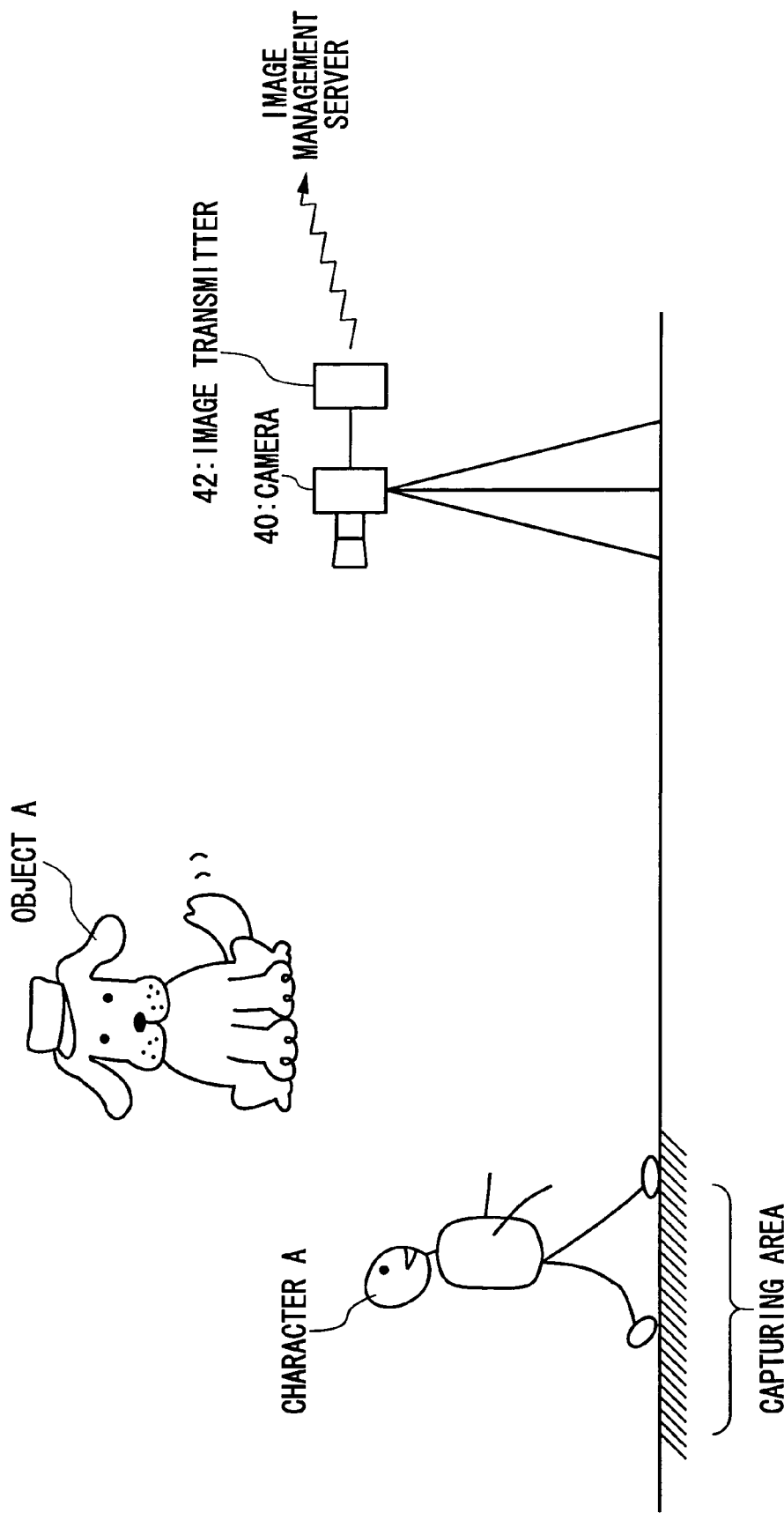
FIG. 11 shows a detection of an image capturing timing when both a certain object and a character are in a predetermined location.

FIG. 11 shows a detection of an image capturing timing where a certain object and a character are in a predetermined location. When an object A is, the camera 40 captures an image. A detection of a position where in a predetermined image capturing region the object A is performed by the above described transmitter and the receiver. Thus, a facial expression when the character A is surprised or pleased with the object A may be properly captured.

Figure 12:
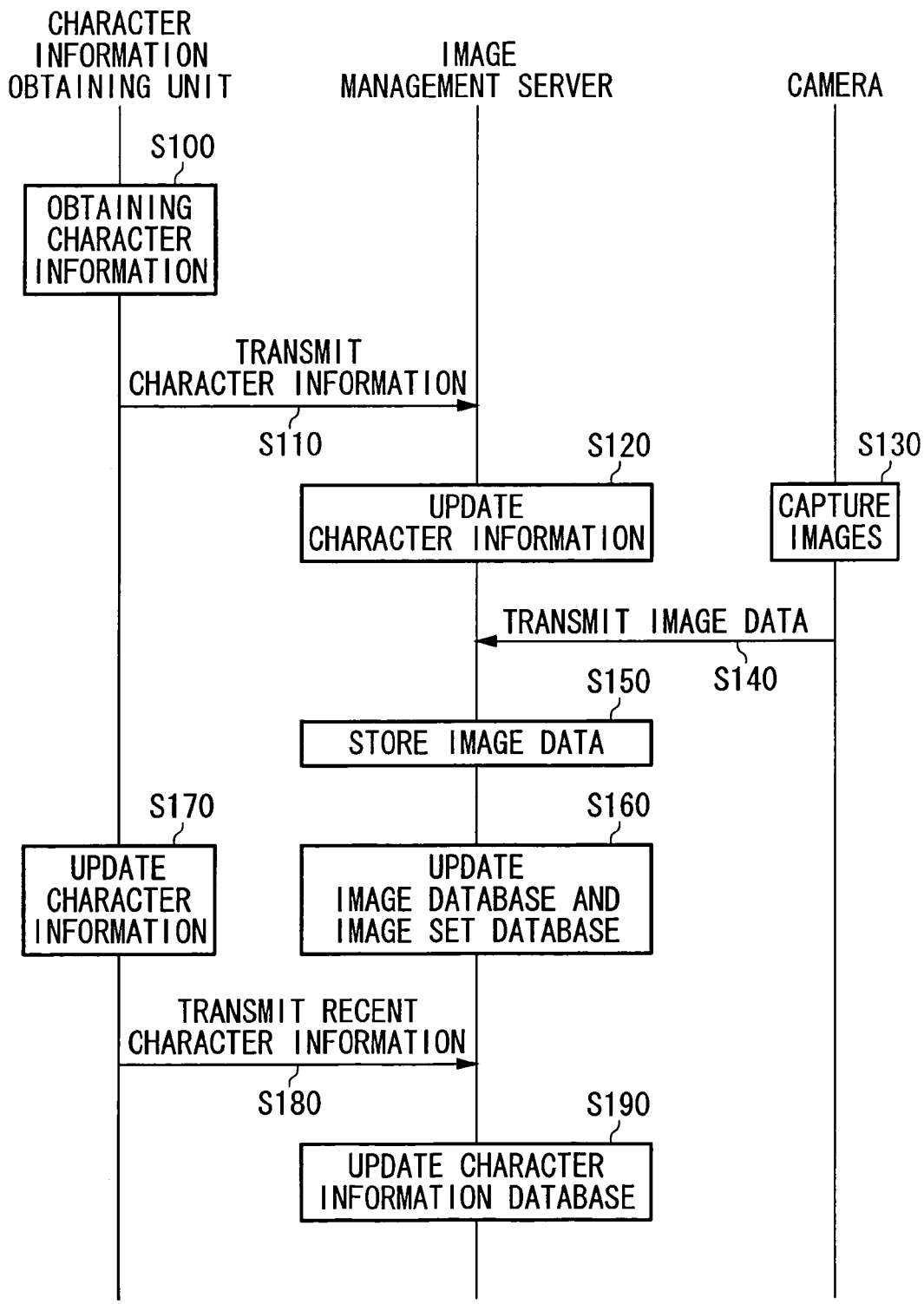
FIG. 12 is a sequence chart indicating data interaction between the image management server 20, the character information obtaining unit 30, and the camera 40 in the camera system.

FIG. 12 is a sequence chart indicating data interaction between the image management server 20, the character information obtaining unit 30, and the camera 40. First, the character information of each character is obtained by the character information obtaining unit 30 (S 100). Here, images are captured for identifying each of the characters, and parameters indicating characteristic of each character's body, face, and outfit are digitized and obtained. The obtained character information is transmitted to the image management server 20 (S 110). The character information database 110 is updated based on the transmitted character information (S 120). Here, the character ID allocated to each of the characters may be transmitted or recorded into an ID card worn by each of the characters. Thus, each of the characters is preferably identified by the character ID. On the other hand, the camera 40 captures images of the characters (S 130). The images maybe captured at a predetermined time interval, at a random interval, or at an automatically predetermined timing. When the camera 40 captures an image, the captured image is transmitted to the image management server 20 (S 140). The transmitted image is stored in the database (S 150). An image ID for identifying the image is allocated to each of the images, and the image database 120 is updated. When the transmitted image is included in an image set, an image set database is also updated (S 160).

On the other hand, the character information obtaining unit 30, when new character information is obtained about the character whose character information is already obtained (S 170), the character information is transmitted to the image management server 20 (S 180). The character information database is updated based on the transmitted character information (S 190). Thus, when the character information about a certain character is changed, for example, a character puts off his or her contact lens and puts on glasses so that face image is changed, or he or she buys a hat and wears it so that the character information about his or her body is changed while he or she is playing may be processed.

Figure 13:
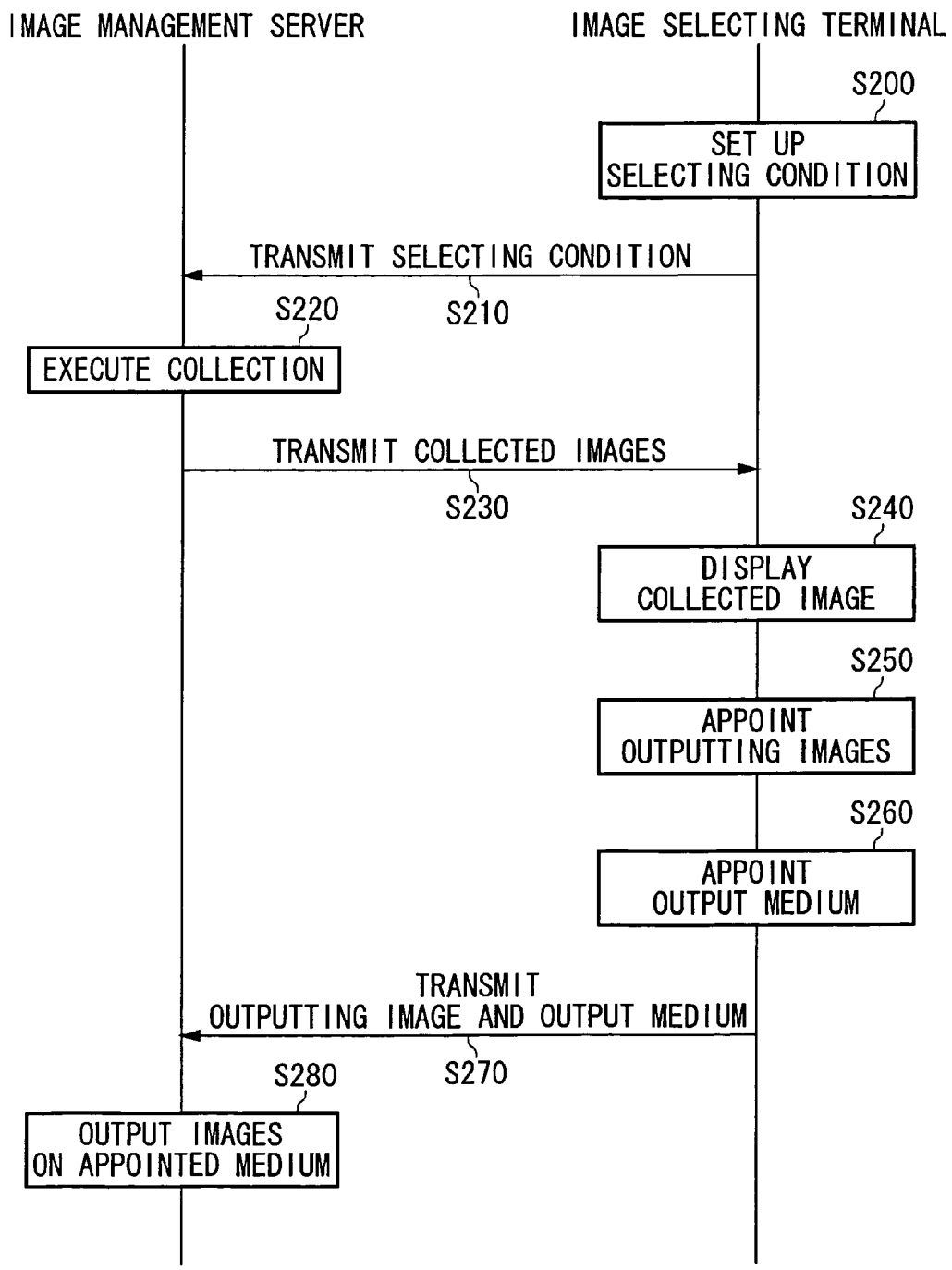
FIG. 13 is a sequence chart indicating an image is searched between the image management server 20 and the image selecting terminal 50.

FIG. 13 is a sequence chart indicating an image is searched between the image management server 20 and the image selecting terminal 50. First, a selecting condition for selecting an image is set in the image selecting terminal 50 (S 200). The selecting condition is, for example, a plurality of predetermined characters is caught, or a certain facial expression such as smiling is caught. The set selecting condition is transmitted to the image management server 20 (S 210). A character identifying unit 95 in the image management server 20 searches in the images stored in the database based on the transmitted selecting condition (S 220). The search of images is executed based on the character information. When the search is finished, a collected image is transmitted to the image selecting terminal 50 (S 230). The collected image is displayed as a list on the image selecting terminal 50 (S 240). The user selects and appoints images he or she wants to purchase from the images displayed as a list (S 250). The user also selects and appoints a medium to output the image on (for example, paper, CD-R, and MD) (S 260). Information about the images and the output medium selected by the user is transmitted to the image management server 20 (S 270). The image management server 20 outputs the appointed image for the appointed medium (S 280).

FIG. 14 shows an example of image selecting condition's information indicated on the image selecting terminal 50. The information shown in FIG. 14 is an example when a user of the image distributing system selects images such that himself or herself or a certain character and himself or herself is caught in. First, the user inputs the character ID registered in the system. Next, the user sets a selecting condition to select images. The selecting condition is, for example, selecting images such that only the user is caught in by himself, herself or a certain character and himself or herself is caught in. Furthermore, a facial expression in the image may be appointed to the selecting condition, for example, an image such that eyes of the character in the image are not closed, the character in the image is smiling. The user may obtain images as he or she prefers.

In other case not shown in figures, the user may set a lower limit for the verification degree between the registered character information and the character included in the images to be collected. For example, the lower limit of the verification degree is set at 50%, the images of which the verification degree is more than 50% are selected. When the collected result is distributed to the user, the images are preferably offered in an order of the verification degree, so that the user may choose the images he or she wants from the distributed images conveniently.

FIG. 15 shows an example of a collected image list and output setting information indicated on the image selecting terminal 50. First, a list of images obtained by search based on the selecting condition appointed by the user. The images on the list are preferably indicated in thumb nail format which show original images in reduced size, so that what is caught in each of the images are easily told by the user. Watching these images, the user may tell the distributed image's content. The user selects the images to be outputted from the distributed list of images.

On the other hand, the user also selects a medium on which the image is outputted. The medium to be used for image distributing may be chosen from paper (printing out an image on paper), CD-R (writing an image into a CD-R), MD (writing an image into an MD), the Web (the image data is distributed at a predetermined URL on the Web, the user downloads the distributed image data by accessing the predetermined URL), and attaching to mail (an image is sent to an E-mail address appointed by the user attached to a mail). Furthermore, the user may select outputting forms of images such as size, picture quality, color tone, and brightness.

Charge amount for outputting images, corresponding to numbers of the images selected by the user and a choice of the output medium, is also indicated as apart the information. The user selects number of outputting images depending on his or her budget, so that the system becomes more user-friendly.

The user, after confirming the settings about image outputting, selects "output" or "purchase", and prompts the system to output the appointed images.

The outputted medium (except distributing on the Web and attaching to e-mail) may be handed to the user at the place, or be delivered to where the user appointed. If the user expects to look at the image at once, the image is handed to the user at once. If the user does not want to carry more or expects to look at the image later, the image is properly delivered. The user may choose the preferred delivery.

Next, an image searching system, which is advantageous for the image searching executed in the present embodiment, will be described. The image searching system uses the character positioning unit 210 shown in FIG. 1, and the position information writing unit 220, the object speed detecting unit 240, the object position forecasting unit 250, and the position information database 230 which are shown in FIG. 2. The image searching system is applied to the image collecting unit 90, the image identifying unit 95, and the image screening unit 300. Here, for example, a case the image collecting unit 90 collects images from the image database 110 is described.

The character positioning unit 210 identifies a character and obtains position information about a position of the character at a certain time. The character positioning unit 210 is connected to communicate with the image management server 20. The obtained position information of the character is transmitted to the image management server 20. When a plurality of the characters is objects, the character positioning unit 210 obtains not only positions of each of the characters, but also relative position of each of the characters. An example of the character positioning unit 210 will be described later.

The position information writing unit 220 executes processing of receiving the position information about each of the characters obtained by the character positioning unit 210 and writing into the position information database 230.

The position information database 230 stores position informations, that is, the position and the time where each of the characters is at a certain time, which is obtained by the character positioning unit 210. An example of the position information database 230 will be described later.

The object speed detecting unit 240 refers times when each of the characters passes two points on a predetermined route which are stored in the position information database 230. Speed of each of the characters is calculated from the distance between these two points and the period to pass these two points. In other case, the character positioning unit 210 may have a speed sensor, in this case, the object speed detecting unit 240 detects a speed of each of the characters directly by the position information sent from the character positioning unit 210.

The object position forecasting unit 250 forecasts where a certain character is when a predetermined period is past since the character passes a predetermined spot, based on the speed of each of the characters calculated by the object speed detecting unit 240.

First, examples for each of the character positioning unit 210 and the position information database 230 will now be described. After this description, an example of image search of the character by the character identifying unit 95 using the position information database 230 will be described.

Figure 16:
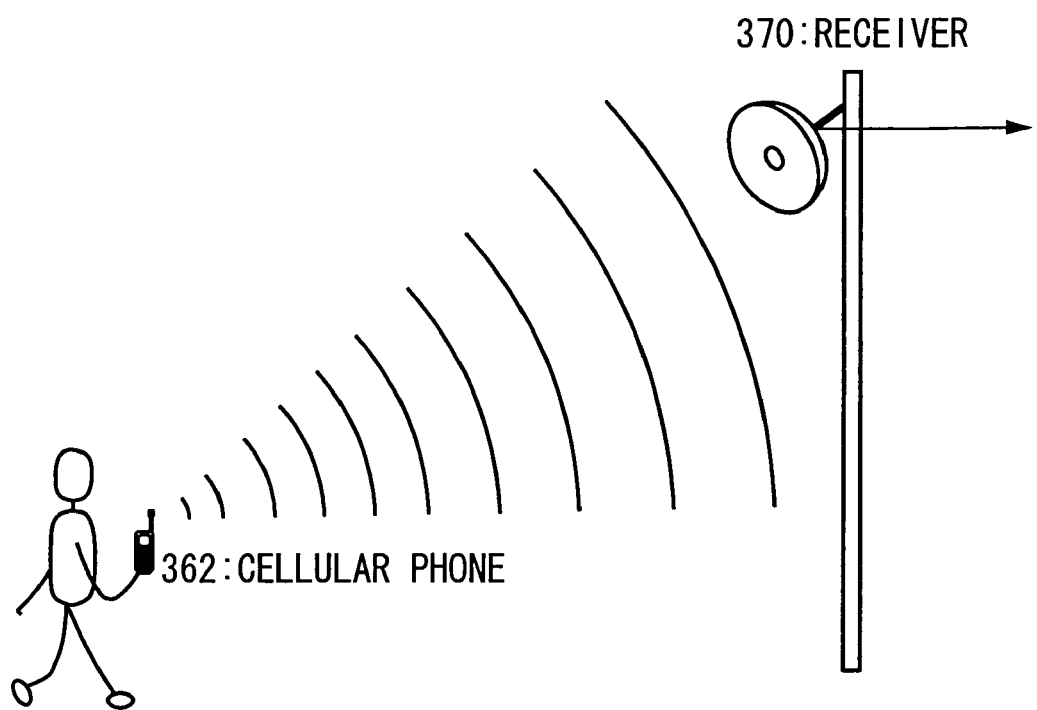
FIG. 16 shows an example for the character positioning unit 210 to obtain the position information.

FIG. 16 shows an example for the character positioning unit 210 to obtain the position information. The character has a wireless communication means 362 (for example, a cellular phone or PHS). The character positioning unit 210 has a receiver 364 which receives radio wave transmitted from the cellular phone or the ID card transmitter as described later, and locates the position of the character using the radio wave received by the receiver.

Figure 17:
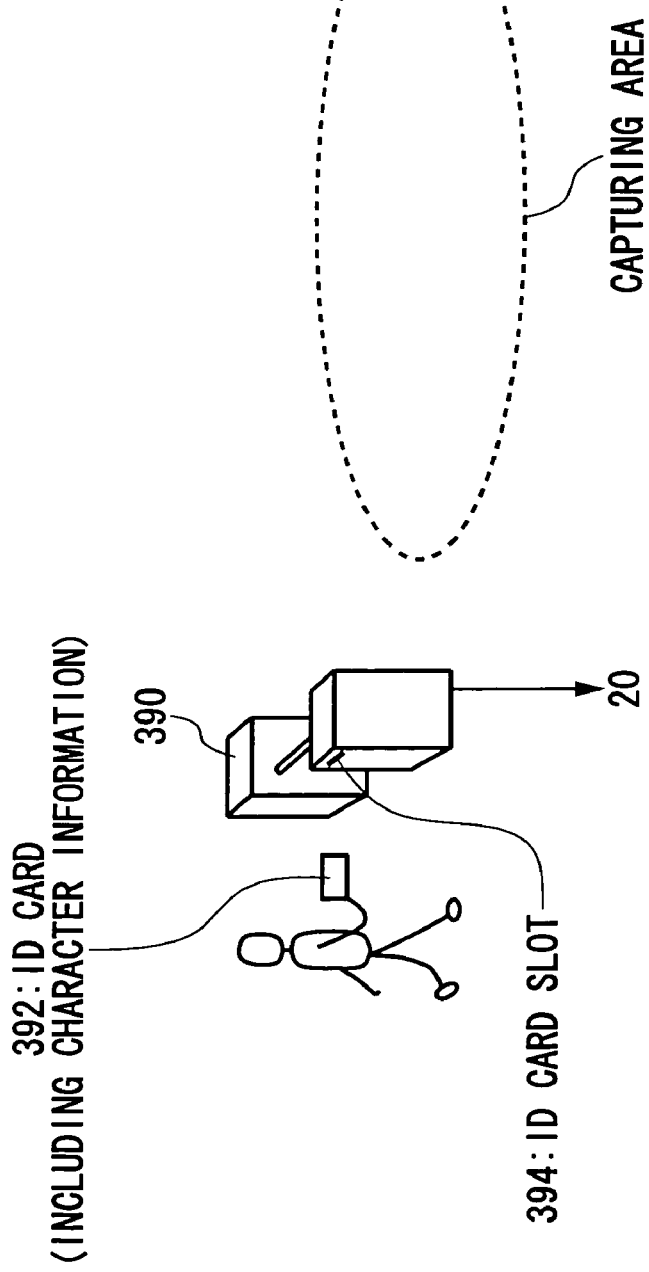
FIG. 17 shows another example of the character positioning unit 210.

FIG. 17 shows another example of the character positioning unit 210. The character has an ID card on which ID information to identify the character is recorded. When the character inserts the ID card into an ID card slot provided on the gate 390, an ID information reader reads the ID information recorded on the ID card. When the ID information is read, the location of the gate 390, the time the character passes the gate 390, and the ID information to identify the character recorded on the ID card are sent to the character positioning unit 210, then transmitted to the position information database 230 and stored.

Figures 18, 19:
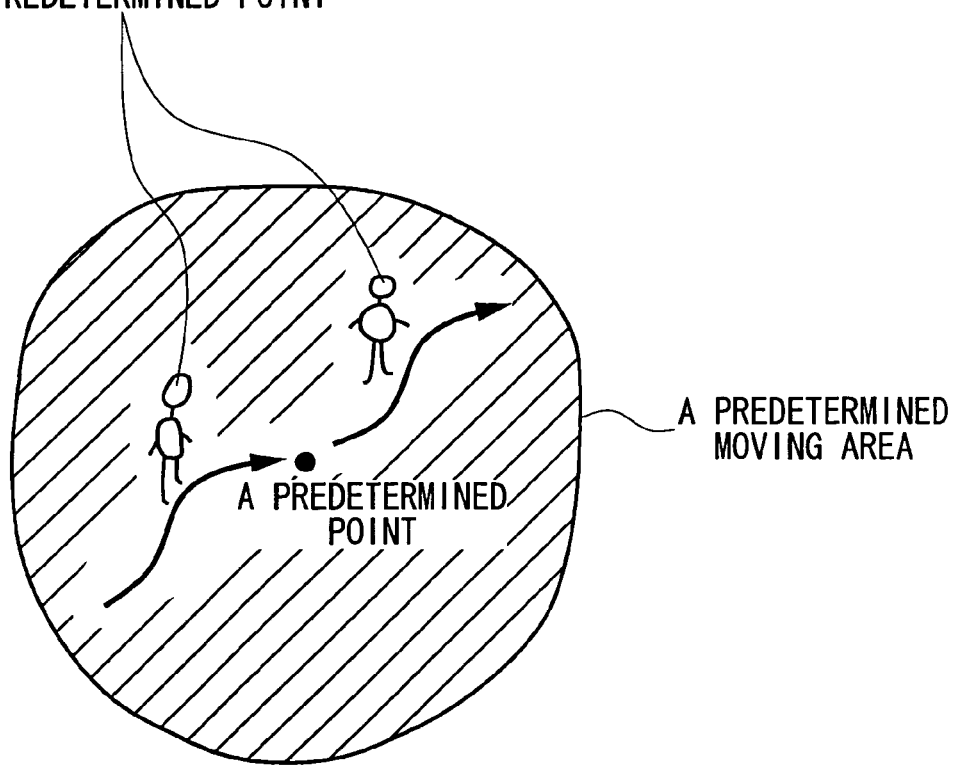
FIG. 18 shows an example of a position information database 230.
FIG. 19 shows an example of collecting images with a character who passes a predetermined point caught therein.

FIG. 18 shows an example of a position information database 230. FIG. 18 is an example of the position information database 230 showing information about a certain character (the character ID to identify the character is, for example, 1). This table records the position information about the character ID obtained by the character positioning unit 210.

The position information recorded in position information database 230 is used when the image collecting unit 90 collects images in which a certain character is caught from the image database 120, the character identifying unit 95 searches images in which a certain character is caught from the image database 120, the image screening unit 300 screens the image transmitted from the camera system 40, and the timing detecting unit 140 detects the image capturing timing. Here, for example, the image collecting unit 90 collects images from the image database 120 will be described. The image collecting unit 90 refers the position information database 230 and obtains position information about a certain character. Using this position information enables to narrow the images for a certain character maybe caught in. That is, if a position information that the character whose character ID is 1 is positioned on point P at a certain time is reported, an image captured by the camera system which captures images including point P and captured at the moment are selected as candidates for the image the character ID1 maybe caught in. Images captured by cameras provided on places except the point P at that moment are omitted from the search objects for the character ID1 may be caught in. Thus, a collecting time that an image a certain character is caught in is collected from images a plurality of unidentified characters is caught in is shortened.

FIG. 19 shows an example of collecting images a character who passes a predetermined point is caught in. If it is confirmed that a certain character passes a predetermined point at a certain time, the position the character may exist is limited to a certain moving area in a predetermined period before and after the time. Therefore, the character positioning unit 210 obtains position information that the character passes the predetermined point and records into the position information database. The image collecting unit 90 searches only images captured in a predetermined period of time and in a moving area which is calculated based on the time the character passes the predetermined point and the predetermined time length. For example, if a character passes the predetermined point at 2 pm, the period to be searched is set as 1:45 pm through 2:15 pm. In this case, images captured by the camera system 40 in the moving area where the character may played while 1:45 pm through 2:15 pm (hatched part in FIG. 19) in the period is set to the object of the search for the images the character may be caught in. Here, the moving area of the characters is calculated from the paths around the predetermined point and an average speed the character usually moves. Thus, the more the period to be searched is shortened, the smaller the moving area of the character which is calculated based on the period to be searched is set.

Figure 20:
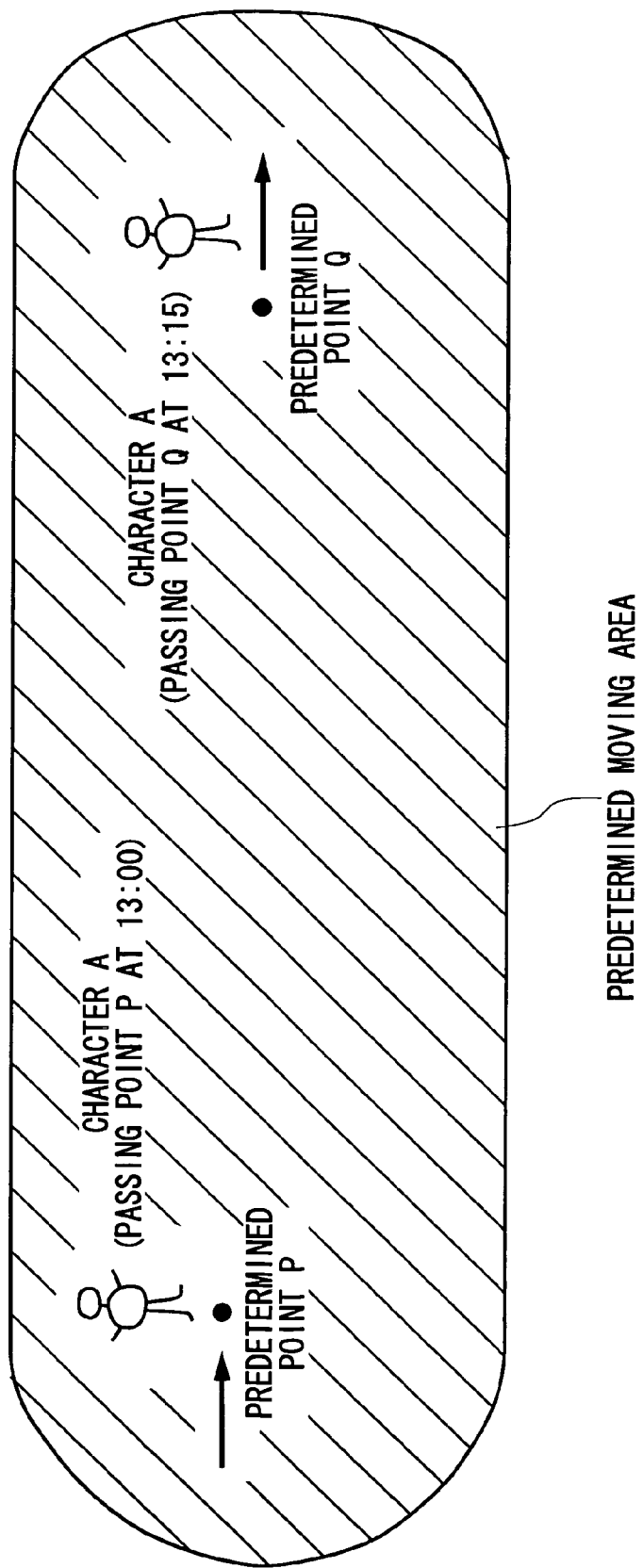

FIG. 20 shows an example of collecting images that a character who passes two different points is caught in. There may be a plurality of routes between the predetermined point P and the other predetermined point Q. The character positioning unit 210 detects that a certain character passes the predetermined point P and the other predetermined point Q. The image collecting unit 90 limits images to be searched for the character caught in such that the images captured by the camera system 40 in a moving area which is set by the time when the character passes the point P and point Q. For example, the character positioning unit 210 detects that a character A passed the point P at 13:00 and next passed another predetermined point Q at 13:15. In this case, the image collecting unit 90 searches images the character A is caught in, in the images captured by the camera system 40 in the period 13:00 through 13:15 and in a moving area set by the period 13:00 through 13:15 (hatched part in FIG. 20). Here, the moving area of a character is calculated from the time when the character passes a predetermined point P and the time when the character passes the another predetermined point Q so that the moving area covers the range where a character usually moves around.

Furthermore, the image collecting unit 90 has a means for collecting images the character is caught in when the character goes through a predetermined route.

Figure 21:
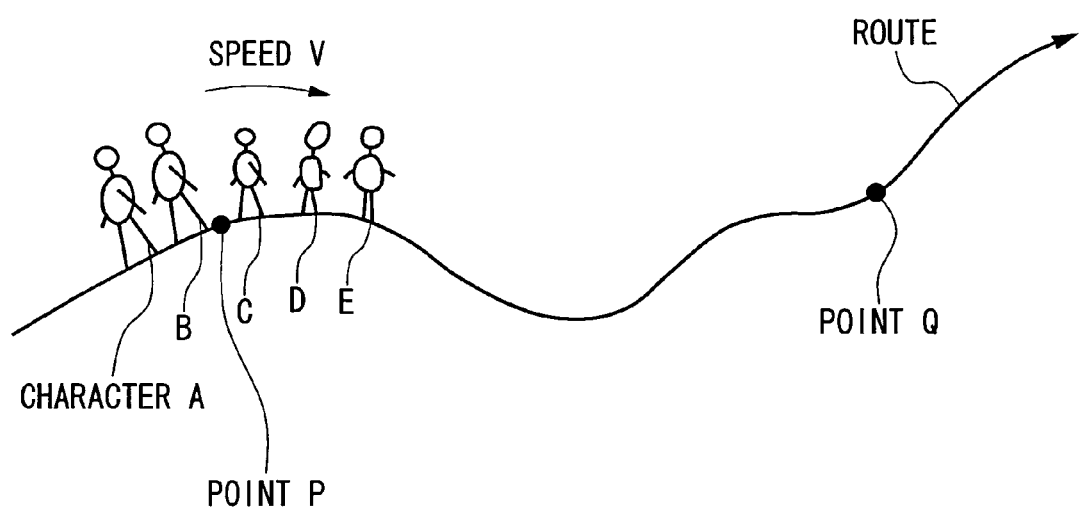
FIG. 21 shows an example of identification of a character position in a predetermined route.

FIG. 21 shows an example of identification of a character position on a predetermined route. The characters go along a predetermined route. A predetermined route is, for example, a route of an attraction provided in the amusement park, a route provided in an aquarium, and soon. When there are a plurality of the characters, the characters go in a row along the predetermined route.

(When there is one character)

The character positioning unit 210 is provided on a predetermined point P so that position information of a certain character may be obtained. Using this position information, it is detected that the certain character exists on some point on the predetermined route around point P in a predetermined period after and before when the character passes the point P. Therefore, candidate images for the images the certain character may caught in are selected such that captured in the period around the passing time of point P and capturing points around the point P on the predetermined route from the image database 120.

Furthermore, another character positioning unit 210 is provided on point Q which is located on ahead of the point P on the predetermined route. As these character positioning units 210, the period while the certain character stayed from point P to point Q on the route is detected, so that the candidate images that the certain character is caught in may be further narrowed.

On the other hand, using the object speed detecting unit 240, it is detected that the speed of the certain character when the certain character passes the point P or the speed of the character goes through a predetermined route, so that more accuracy on the narrowing the selection of images may be realized. That is, an outline position of the certain character exists after he or she passed the point P may be forecasted based on when the certain character passes the point P and the speed of the character. More narrowing of images to be collected for images the certain character may be caught in is further executed based on this forecasted point at a certain time.

(When there is a plurality of characters)

In some case, a sequence of characters changes only a little while a plurality of characters goes along a route. In such case, characters may be effectively identified by detecting the sequence of the characters. FIG. 21 shows an example of identifying position of characters on a predetermined route. Here, the character B is passing the point P at the moment. The character B is going along the predetermined route between the character A and the character C. The position information about the character B at the moment includes information about the characters before and after the character B. Thus, as long as the sequence of the characters does not change, the sequence of the character may be forecasted at points after the point P. The characters before and after the character B in the sequence may be identified using the position information of the character B at the moment the character B passes the point P when the character B is identified in the images captured at point after the point P.

Applying the above described image collecting system, when images the character possibly caught in is collected from the images captured at various points in various time, the system collects images which have higher possibility the character caught in for search objects based on the position information of the character. Therefore, the collecting images is executed effectively. Here, the description of the image searching system will be finished.

At last, other configurations of the image screening unit 300 which is included in the image management server 20 will be described. The other configurations of the image screening unit 300 limits numbers of images captured by the camera system 40.

Figure 22:
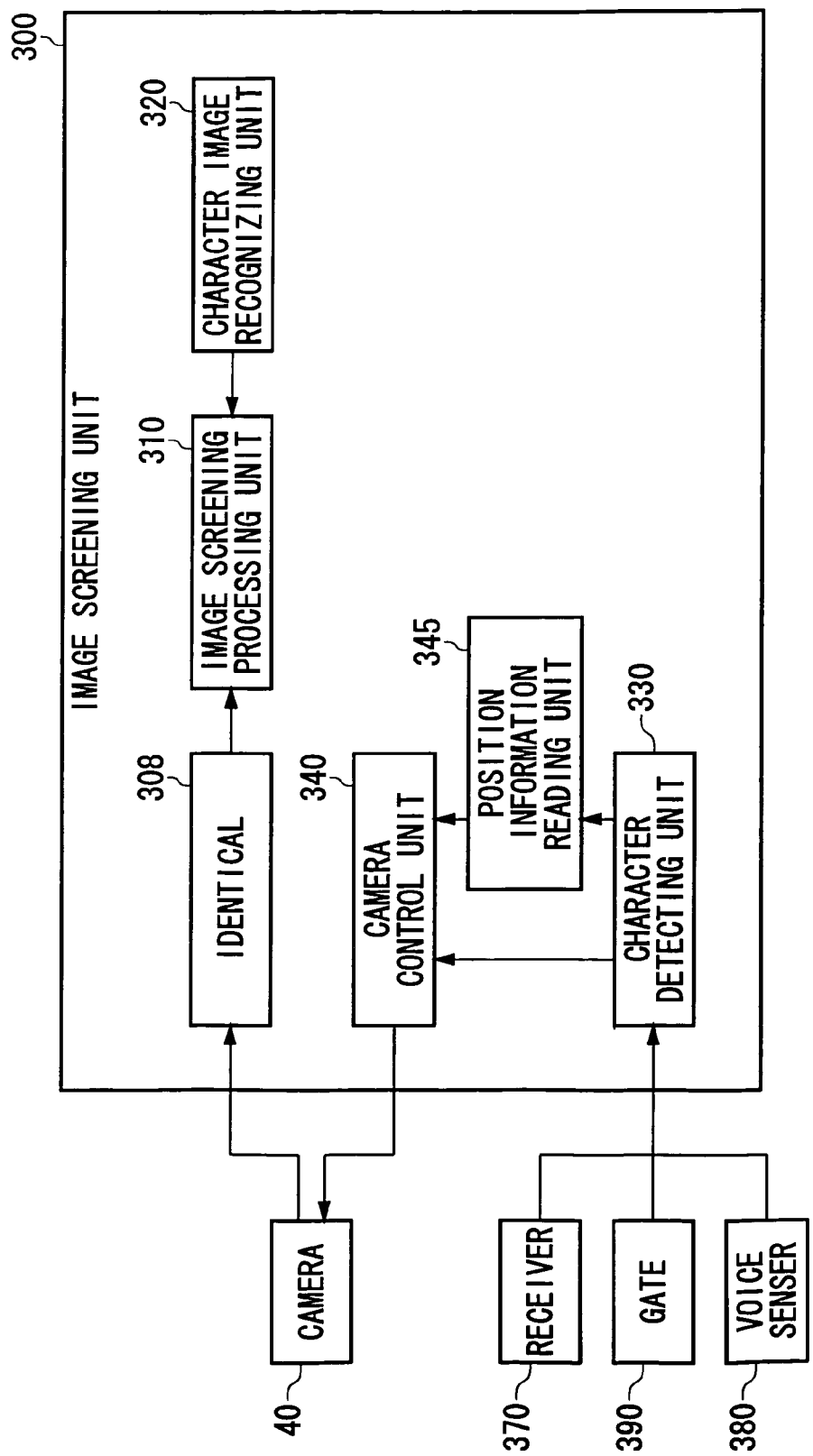
FIG. 22 shows the configuration of the image screening unit 300.

FIG. 22 shows the configuration of the image screening unit 300. The image screening unit 300 has an identical image selecting unit 308, an image screening processing unit 310, a character image recognizing unit 320, a character detecting unit 330, and a camera control unit 340.

The identical image selecting unit 308 executes processing of selecting images the same character caught in from a plurality of images captured by the camera system 40 within a predetermined area.

The image screening processing unit 310 executes processing of limiting the images, which is selected by the identical image selecting unit 308 and each of the characters caught in, to a predetermined number based on a predetermined condition.

The character image recognizing unit 320 recognizes a facial expression of each of the characters caught in the images captured by the camera system 40.

When the identical image selecting unit 308 recognizes that a same character is caught in a plurality of images captured in a certain area, the image screening processing unit 310 decreases a number of images in which the same character is caught based on a predetermined condition. This processing is, for example, saving the first captured image of the character and deleting rest of images the same character caught in. Thus, the number of images maybe reduced when there is plurality of images the same character caught in at similar background and these plurality of images are not so different from each other.

Figure 23:
FIG. 23 shows an example of the processing executed by the character image recognizing unit 320.
Figure 23:
Figure 23:
Figure 23:

FIG. 23 shows an example of the processing executed by the character image recognizing unit 320. Conditions for deleting images from a plurality of images the same person caught in are shown in FIG. 23. The condition for deleting images are, for example, "an eye of a character is closed", "a facial expression of a character is angry". The character image recognizing unit 320 chooses images based on the appointed condition. In the example shown in FIG. 23, the image 1 and the image 3 are chosen, but the image 2 (eyes are closed) and the image 4 (facial expression is angry) are not chosen. Thus, images caught in the character whose facial expression meets the condition may be obtained effectively.

On the contrary, a condition for saving may be appointed for choosing images from a plurality of images a same character caught in the condition. The condition for saving is, for example, "the character caught in the image is smiling".

The description about the image screening unit 300 which reduces number of the captured images based on a predetermined condition will be finished. This limitation is also applied to collecting performed by the image collecting unit 90 and identifying performed by the character identifying unit 95.

Next, limitation on number of the camera system 40 captures images executed by the image screening unit 300 will be described here.

Figure 24:
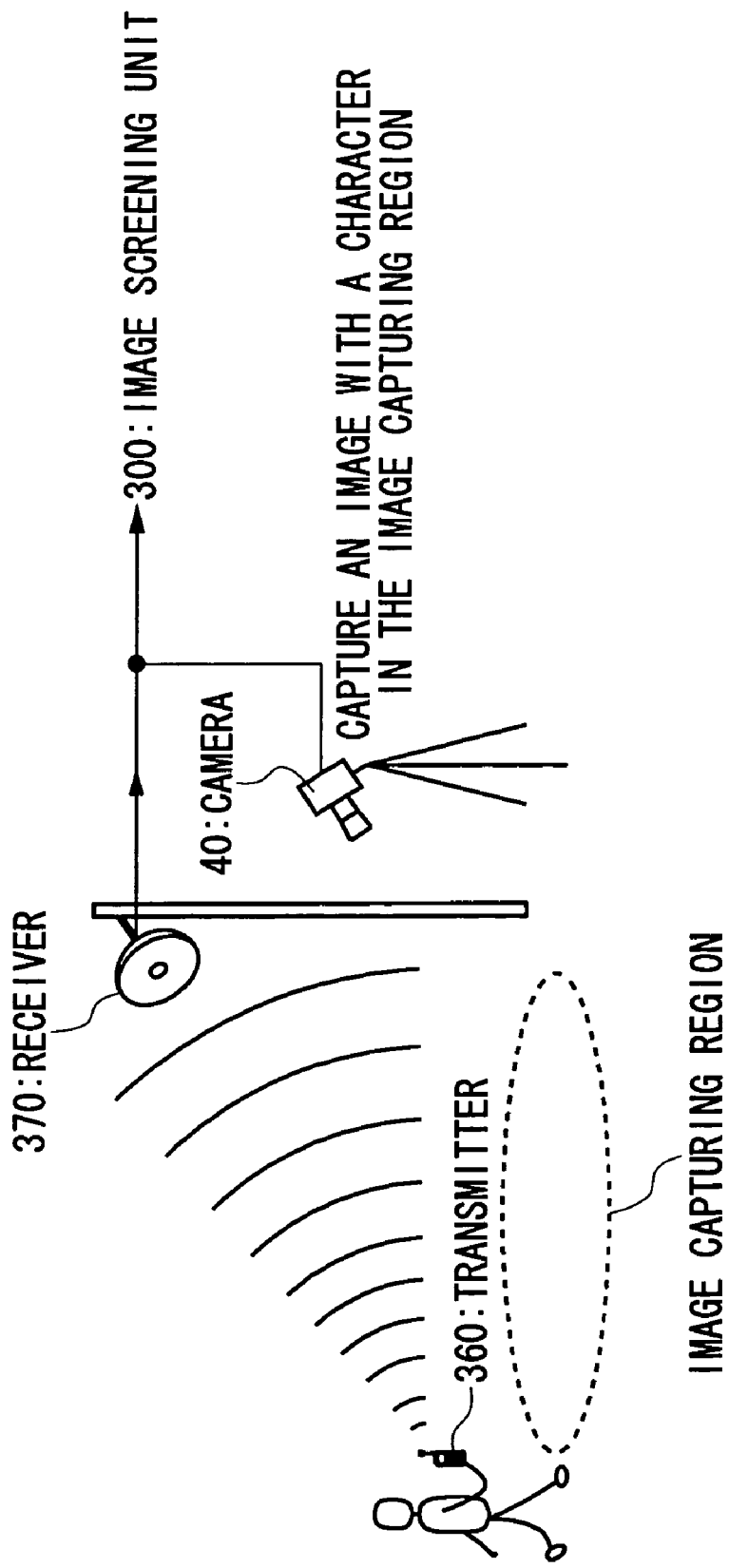
FIG. 24 shows an example for detecting a position of a character executed by the character detecting unit 330.

FIG. 24 shows an example for detecting a position of a character executed by the character detecting unit 330. In this case, the character has a radio wave transmitter 360 transmitting radio wave. The radio wave transmitter 360 maybe a wireless communication means, for example, a cellular phone, or a PHS. The radio wave detector 370 receives the radio wave transmitted from the radio wave transmitter 360. Position of the character who has the transmitter is detected by strength of the received radio wave. Thus, when it is detected that the character is on a predetermined position, the camera control unit 340 prompts the camera system 40 to capture image of the character in the predetermined region.

Figure 25:
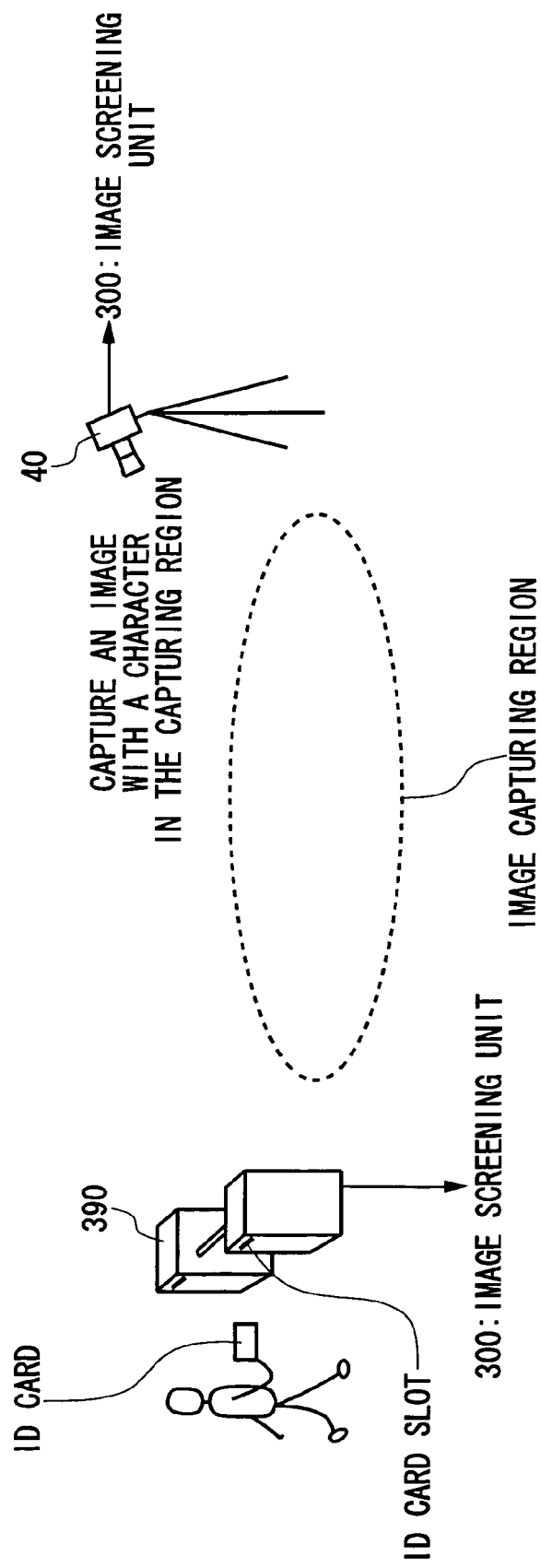
FIG. 25 shows another example of detection that the character detecting unit 330 detects a position of a character.

FIG. 25 shows another example of detection that the character detecting unit 330 detects a position of a character. In this case, the character has an ID card in order to pass the gate 390. The character detecting unit 330 detects ingression of the character by insertion of the ID card into an ID card slot provided on the gate 390. After predetermined period passes since the character ingresses, the camera control unit 340 prompts the camera system 40 to capture an image.

Figure 26:
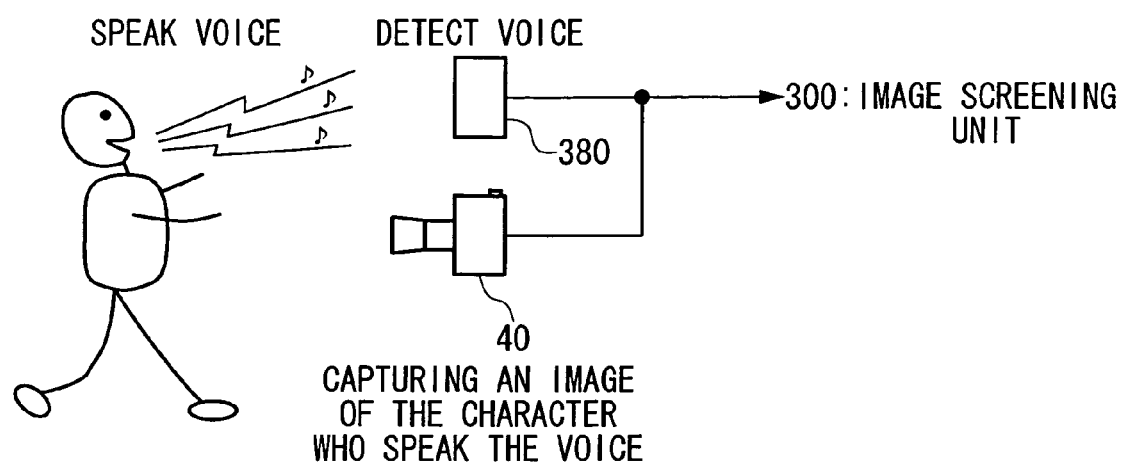
FIG. 26 shows an example of image capturing using a voice sensor 380.

FIG. 26 shows an example of image capturing using a voice sensor 380. The voice sensor 380 detects voice such as whoop the character cries. When the whoop is detected, the camera system 40 is prompted to capture an image automatically. Thus, the facial expression of the character when the character is surprised or pleased by a predetermined object in the amusement facility may be effectively captured in the image, without capturing too many images of which facial expression is ordinary before and after the whooping moment.

Therefore, using the image screening unit 300, number of the image to be searched may be reduced, and only the images captured in a proper timing are saved.

The obtaining position information of characters and the timing detection for screening image described above is also applied to the timing detecting performed by the timing detecting unit 140 for capturing preferable images.

Applying the above described image distributing system 10, an image of a character playing in an amusement park with natural facial expression may be captured, the images a certain character caught in is searched from the captured images and distributed to the character himself or herself.

This system is also applied for security use, for detecting a registered person, for example, a habitual shoplifter. Applying this system, watching for the shoplifting using a camera system is effectively executed. In such case, an announcement that a shoplifter is registered to the security system works as a warning to prevent crime.

It is obvious from the description above, according to the present invention, the user is not required to capturing images of himself or herself anymore. The user may search the images of himself or herself with natural facial expression is caught in from images unspecified number of characters are caught in, and purchases the personalized images.

Furthermore, accuracy of image search maybe improved applying the position information to search images.

Limiting number of images captured in a certain region for each of the characters may reduce load for selecting images.

Although the present invention has been described by way of exemplary embodiments, it should be understood that those skilled in the art might make many changes and substitutions without departing from the spirit and the scope of the present invention which is defined only by the appended claims.

What is claimed is:

1. An image distributing system for distributing an image having a target character, comprising:
   a character information obtaining unit for capturing a first image of the target character and obtaining character information of the target character;
   a camera system for capturing a plurality of images including a second image having at least the target character;
   an image database communicating with said camera system for receiving and storing said plurality of images as image data;
   an image collecting unit for setting a selecting condition set by a user, and for automatically selecting said second image data among said plurality of said image data stored in said image database by identifying the target character according to character information thus obtained for distributing the second image including the target character, said selecting condition is a condition for selecting a specific characteristic of the target character;
   an image selecting terminal displaying a list of images collected by said image collecting unit to the user so that said list of images are capable of being selected by the user;
   an output processing unit outputting the images selected by the user from said list of images as displayed to at least one of a plurality of a medium appointed by the user;
   a character positioning unit for obtaining a time when the target character passes a predetermined point; and
   an object speed detecting unit for calculating a speed of the target character based on a distance between two points and a time for the target character to pass the two points;
   wherein the image collecting unit searches only images captured in a predetermined period of time and in a moving area which is calculated based on the time when the target character passes the predetermined point and the speed of the target character.

2. The image distributing system as claimed in claim 1, further comprising a signal transmitter for transmitting image data from said camera system to said image database.

3. The image distributing system as claimed in claim 1, wherein said image selecting terminal includes means for capturing an image of the user who is to select images.

4. The image distributing system as claimed in claim 3, wherein said image selecting terminal further includes means for verifying the user who is to select images based on the character information.

5. The image distributing system as claimed in claim 1, wherein said image selecting terminal distributes the image data of said images selected by the user.

6. The image distributing system as claimed in claim 1, further comprising an outputting unit outputting the image data of said images collected by said image collecting unit.

7. The image distributing system as claimed in claim 6, wherein said outputting unit distributes the outputted image data.

8. The image distributing system as claimed in claim 6, wherein said image selecting terminal transmits to said outputting unit image selection information representing which images are selected by the user.

9. The image distributing system as claimed in claim 6, wherein said outputting unit includes at least one of a printer, a CD-R recorder, an MD recorder, a web server for distributing the collected images via the Internet, means for sending E-mail with the collected images attached.

10. The image distributing system as claimed in claim 1, wherein the character information includes data about at least one of a facial characteristic, body characteristic, and characteristic of wearing apparel of the target character.

11. The image distributing system as claimed in claim 1, wherein said camera system includes a plurality of cameras located within a predetermined area.

12. The image distributing system as claimed in claim 1, wherein said image collecting unit identifies a plurality of characters in said image data based on character information corresponding to each of the plurality of characters.

13. The image distributing system as claimed in claim 1, wherein said character information obtaining unit imports an image of the target character to a character information database as the character information of the target character.

14. The image distributing system as claimed in claim 13, wherein:
said character information obtaining unit has a plurality of cameras for capturing character information,
said character information obtaining unit imports a plurality of images of the target character captured from a plurality of different angles by a respective one of said plurality of cameras, and
said image collecting unit identifies and collects, based on the plurality of images captured from the plurality of angles, said images having the target character stored in said image database.

15. The image distributing system as claimed in claim 13, wherein said character information obtaining unit updates previously obtained character information with newly obtained character information for the target character.

16. The image distributing system as claimed in claim 1, wherein:
said character information includes a registration of data of refusal to be imaged by a person, and
said image collecting unit does not collect images when at least one character in an image is a person who refuses to be imaged.

17. The image distributing system as claimed in claim 1, wherein said camera system includes at least one camera that is movable and said mobile camera has a wireless transmitter.

18. The image distributing system as claimed in claim 17, wherein said mobile camera is installed in a mobile facility, which is an object for attracting attention of the target character.

19. The image distributing system as claimed in claim 1, further comprising a character identifying unit for identifying the target character in a plurality of images, wherein when a character is identified in one of the plurality of images as the target character, said character identifying unit also identifies the same character in the rest of the plurality of images as the target character.

20. The image distributing system as claimed in claim 19, wherein said camera system includes a plurality of cameras located within a predetermined area.

21. The image distributing system as claimed in claim 19, wherein:
said camera system includes a camera group including a plurality of cameras, each camera of said plurality of cameras captures an image of a character such that the character is imaged from a plurality of different angles by said plurality of cameras, and
wherein when the character in an image captured by one of said plurality of cameras in said camera group is identified as the target character, said character identifying unit identifies the same character in other images captured by other of said plurality of cameras in said camera group as the target character.

22. The image distributing system as claimed in claim 19, wherein said camera system includes a camera group including a plurality of cameras, each camera of said plurality of cameras captures an image of a character such that the character is imaged at a plurality of different time periods by said plurality of cameras, and
wherein when the character in an image captured by one of said plurality of cameras in said camera group is identified as the target character, said character identifying unit identifies the same character in other images captured by other of said plurality of cameras in said camera group as the target character.

23. The image distributing system as claimed in claim 1, wherein said image collecting unit identifies the target character substantially at the time an image with the target character is captured by said camera system.

24. The image distributing system as claimed in claim 23, wherein said image collecting unit saves only image data with the target character to said image database.

25. The image distributing system as claimed in claim 1, wherein:
when said image collecting unit identifies the target character as a person who refuses to be imaged substantially at the time an image is captured by said camera system and when at least one person in said image is identified as the target character who refuses to be imaged, said image collecting unit does not collect images with the target character who refuses to be imaged.

26. The image distributing system as claimed in claim 1, further comprising a timing detecting unit for detecting a timing to capture an image with the target character,
wherein said camera system captures said plurality of images with the target character when said timing detecting unit detects said timing for capturing said plurality of images.

27. The image distributing system as claimed in claim 26, wherein said timing detecting unit detects, based on position information about a plurality of characters, said timing for capturing an image when said plurality of characters are at a predetermined position.

28. The image distributing system as claimed in claim 26, further comprising means for prompting a person in a predetermined area to carry a transmitter for transmitting radio waves,
wherein said timing detecting unit includes a receiver for receiving the radio waves, and said timing detecting unit determines a distance between said transmitter and said receiver based on the radio waves transmitted from said transmitter, and detects said timing for capturing an image when the distance is determined to be a predetermined distance.

29. The image distributing system as claimed in claim 28, wherein said transmitter includes one of an ID card and a cellular phone.

30. The image distributing system as claimed in claim 28, wherein the radio waves transmitted and received between said transmitter and said receiver include the character information.

31. The image distributing system as claimed in claim 28, wherein said image collecting unit identifies the target character substantially at the time when an image is captured by said camera system.

32. The image distributing system as claimed in claim 28, wherein said means for prompting a person prompts a person who refuses to be imaged to carry a transmitter.

33. The image distributing system as claimed in claim 32, wherein when said image collecting unit identifies the target character as a person who refuses to be imaged substantially at the time an image is captured by said camera system, and when at least one person in said image is identified as the target character who refuses to be imaged, said image collecting unit does not collect images with the target character who refuses to be imaged.

34. The image distributing system as claimed in claim 28, wherein at least one of the radio waves transmitted and received between said transmitter and said receiver is a directional radio wave.

35. The image distributing system as claimed in claim 26, wherein said timing detecting unit detects a position of the target character and a position of an object for attracting attention of the target character.

36. The image distributing system as claimed in claim 26, wherein said timing detecting unit detects that both the target character and an object for attracting attention of the target character are in a predetermined range to be captured in an image.

37. The image distributing system as claimed in claim 1, wherein said camera system transmits the image data to said image database substantially every time an image is captured.

38. The image distributing system as claimed in claim 1, wherein said camera system transmits the image data to said image database substantially at predetermined time intervals.

39. The image distributing system as claimed in claim 1, wherein said camera system transmits the image data to said image database when a predetermined number of images are stored in the camera system.

40. The image distributing system as claimed in claim 1, wherein said camera system transmits the image data to said image database upon at least one of a predetermined number of images being stored and a predetermined time interval having elapsed.

41. The image distributing system as claimed in claim 1, wherein the system is structured and arranged in an amusement park.

42. A method for distributing an image having a target character, comprising:
registering character information for the target character;
capturing a plurality of images having the target character;
storing image data of said plurality of images;
automatically identifying the target character in each of said plurality of images based on the character information;
obtaining a time when the target character passes a predetermined point;
calculating a speed of the target character based on a distance between two points and a time when the target character passes the two points;
collecting a target image having the target character from the stored image data;
distributing said target image to the target character;
displaying a list of collected images having the target character obtained by a search based on a selecting condition set by a user to the user so that said list of images are capable of being selected by the user, said selecting condition is a condition for selecting a specific characteristic of the target character; and
outputting the images elected by the user from said list of images as displayed to at least one of a plurality of a medium appointed by the user;
wherein only images captured in a predetermined period of time and in a moving area which is calculated based on the time when the target character passes the predetermined point and the speed of the target character, are searched.

43. The method for distributing an image as claimed in claim 42, further comprising the step of outputting image data of collected images having the target character.

44. The method for distributing an image as claimed in claim 42, further comprising the step of distributing image data of collected images having the target character.

45. The method for distributing an image as claimed in claim 42, further comprising the step of distributing image data of images selected by the user for distribution.

46. The method for distributing an image as claimed in claim 42, further comprising a step of limiting the user to selecting images having the user as the target character based on the character information.

47. The method for distributing an image as claimed in claim 46, wherein the step of limiting the user includes verifying that the user who selects an image is the target character based on the character information.

48. The method for distributing an image as claimed in claim 42, further comprising steps of:
outputting collected images having the target character, and
notifying that image data for selected images is outputted.

49. The method for distributing an image as claimed in claim 42 wherein said step of registering character information includes a step of importing an image of the target character for the character information.

50. The method for distributing an image as claimed in claim 49, wherein said step of registering character information includes a step of importing a plurality of images of the target character, said plurality of images comprising images from a plurality of angles which are different from one another, wherein
said step of identifying the target character identifies the target character based on the plurality of images imported as the character information of the target character.

51. The method for distributing an image as claimed in claim 42, wherein said step of registering character information registers data about at least one of a facial characteristic, body characteristic, and characteristic of wearing apparel for the target character.

52. The method for distributing an image as claimed in claim 51, wherein said step of registering character information includes steps of:
obtaining an image of the target character, said image having at least one of the face, body, and wearing apparel of the target character; and storing data about at least one of a facial characteristic, body characteristic, and wearing apparel characteristic for the target character as the character information.

53. The method for distributing an image as claimed in claim 42, wherein said step of registering character information includes a step of updating the character information for the target character when new character information is obtained.

54. The method for distributing an image as claimed in claim 42, wherein:
said step of registering character information includes registering in a character information database a refusal of a person who refuses to be imaged,
said step of identifying identifies the target character as a person who refuses to be imaged based up on said registration of the refusal, and
said step of collecting does not collect images having at least one person who refuses to be imaged.

55. The method for distributing an image as claimed in claim 42, wherein said step of capturing images captures images using a camera system, and the camera system includes a plurality of cameras located within a predetermined area.

56. The method for distributing an image as claimed in claim 42, wherein said step of capturing images captures images using a mobile camera, further comprising a step of transmitting images from the mobile camera by wireless means.

57. The method for distributing an image as claimed in claim 56, further comprising the step of installing the mobile camera on an object for attracting attention of the target character,
wherein said, step of capturing images captures images from the object for attracting attention.

58. The method for distributing an image as claimed in claim 42, wherein when a person is caught in a plurality of images, and when said step of identifying the target character identifies a person as the target character in one of the plurality of images, said step of identifying also identifies the person in the other of the plurality of images as the target character.

59. The method for distributing an image as claimed in claim 58, wherein said step of capturing images captures a plurality of images from a plurality of cameras located within a predetermined area.

60. The method for distributing an image as claimed in claim 59, further comprising a step of providing a camera group having a plurality of cameras,
wherein said step of capturing images includes capturing by each camera in the plurality of cameras an image of a character such that the character is imaged from a plurality of different angles,
wherein when the character in one of the plurality of images is identified as the target character, said step of identifying the target character identifies the same character in other images captured by said plurality of cameras in the camera group as the target character.

61. The method for distributing an image as claimed in claim 59, further comprising the step of providing a camera group having a plurality of cameras,
wherein said step of capturing images includes capturing by each camera in the plurality of cameras an image of a character such that the character is imaged at a plurality of different time periods, and
wherein when the character in one of the plurality of images is identified as the target character, said step of identifying the target character identifies the same character in other images captured by said plurality of cameras in the camera group as the target character.

62. The method for distributing an image as claimed in claim 42, wherein said step of identifying the target character identifies a person caught in an image as the target character substantially at the time when the image is captured.

63. The method for distributing an image as claimed in claim 62, wherein said step of collecting a target image comprises a step of saving only image data having the target character.

64. The method for distributing an image as claimed in claim 62, wherein:
said step of registering character information includes registering a refusal of a person who refuses to be imaged,
said step of identifying a target character includes identifying the target character in an image as the person who refuses to be imaged substantially at the time when the image is captured, and
when said step of identifying a target character identifies at least one person in the image as the person who refuses to be imaged, said step of collecting images does not collect said image having at least one person who refuses to be imaged.

65. The method for distributing an image as claimed in claim 42, wherein said step of identifying a target character identifies a plurality of characters in an image based on character information corresponding to each of the plurality of characters.

66. The method for distributing an image as claimed in claim 42, further comprising a step of detecting a timing for said step of capturing images, wherein said step of capturing images captures the images when the timing is detected.

67. The method for distributing an image as claimed in claim 66, wherein said step of detecting a timing includes a step of locating a position of the target character based on position information of the target character, wherein
when said step of locating a position locates the target character at a predetermined position, said step of detecting a timing detects the timing for capturing images.

68. The method for distributing an image as claimed in claim 67, further comprising the step of transmitting radio waves from the target character, wherein said step of detecting a timing includes receiving the radio waves, and wherein said step of locating a position includes calculating a distance between a camera system for capturing images and the target character based on the radio waves transmitted and received, and said step of capturing images captures an image when the calculated distance between the camera system and the target character is a predetermined distance.

69. The method for distributing an image as claimed in claim 66, wherein said step of detecting a timing includes locating a position of the target character and a position of a predetermined object to be captured in an image, wherein said step of capturing images captures an image when both the target character and the predetermined object are located within a predetermined area.

70. The method for distributing an image as claimed in claim 42, further comprising a step of transmitting image data captured at said step of capturing images to be stored substantially at the time an image is captured.

71. The method for distributing an image as claimed in claim 42, further comprising a step of transmitting image data captured at said step of capturing images to be stored at predetermined time intervals.

72. The method for distributing an image as claimed in claim 42, further comprising a step of transmitting image data captured at said step of capturing images to be stored when a predetermined number of images are captured.

73. The method for distributing an image as claimed in claim 42, further comprising a step of transmitting image data captured at said step of capturing images to be stored upon at least one of a predetermined number of images being stored in a camera system for capturing the images and a predetermined time interval having elapsed.

74. The method for distributing an image as claimed in claim 42, further comprising a step of outputting image date comprising at least one of printing images on paper, recording images on a CD-R, recording images on an MD, distributing images at a predetermined URL, and sending E-mail with images attached thereto.

75. The method for distributing an image as claimed in claim 42, wherein the methods take place in an amusement park.

76. A business method for distributing an image having a target character, comprising the steps of:
registering character information for the target character;
capturing a plurality of images in which a person who is the target character is caught,
storing image data of said plurality of images;
setting a selecting condition set by a user;
automatically collecting at least one target image from said plurality of images in which the target character is caught from the stored image data based on the registered character information;
obtaining a time when the target character passes a predetermined point;
calculating a speed of the target character based on a distance between two points and a time when the target character passes the two points;
prompting the user to select an image with the target character to be distributed from the at least one collected image;
distributing the selected image in which the target character is caught based on information about the selected image;
displaying a list of collected images having the target character obtained by a search based on a selecting condition appointed by a user to the user so that said list of images are capable of being selected by the user, said selecting condition is a condition for selecting a specific characteristic of the target character;
outputting the images elected by the user from said list of images as displayed to at least one of a plurality of a medium appointed by the user,
wherein only images captured in a predetermined period of time and in a moving area which is calculated based on the time when the target character passes the predetermined point and the speed of the target character, are searched.

77. The image distribution system as claimed in claim 1, further comprising:
a character information database for storing said character information of the target character obtained in said character information obtaining unit;
wherein said image collecting unit obtains said character information from said character information database for identifying the target character.

78. The image distribution system as claimed in claim 1, wherein a character ID is allocated to the target character when said character information obtains said character information from the target character.

79. The image distribution system as claimed in claim 1, wherein said character information obtaining unit obtains said character information of the target character from the first image after said camera system captures said plurality of images including said second image;
said image distribution system further comprising:
an image screen unit for checking if the target character is caught in said plurality of images captured in said camera system for storing said second image.

80. The method for distributing the image having the target character as claimed in claim 42, wherein said registering character information for the target character is performed after said capturing the plurality of images is performed.

81. The method for distributing the image having the target character as claimed in claim 42, wherein said registering character information for the target character is performed before said capturing the plurality of images is performed.

82. The method of claim 42 comprising the step of:
detecting a characteristic sound to capture an image with the target character and capturing the image with the target character when the characteristic sound is detected.

83. The image distribution system of claim 1,
wherein the target character is a person shown in the image.

84. The method of claim 42,
wherein the target character is a person shown in the image.

85. The image distribution system of claim 1,
wherein said camera system automatically captures said plurality of said images.

86. The method of claim 42,
wherein said capturing said plurality of images having the target character is done automatically.

87. The business method of claim 76,
wherein said capturing said plurality of images in which a person who is the target character is caught is done automatically.

88. The image distribution system of claim 1,
wherein said character information represents a characteristic of the target character.

89. The method of claim 42,
wherein said character information represents a characteristic of the target character.

90. The business method of claim 76,
wherein said character information represents a characteristic of the target character.

91. The image distribution system of claim 1,
wherein said selecting condition is to select images with only the user or to select images with the user and other characters.

92. The method of claim 42,
wherein said selecting condition is to select images with only the user or to select images with the user and other characters.

93. The business method of claim 76,
wherein said selecting condition is to select images with only the user or to select images with the user and other characters.

94. The image distribution system of claim 1,
wherein said medium is a physical photographic medium.

95. The method of claim 42,
wherein said medium is a physical photographic medium.

96. The business method of claim 76,
wherein said medium is a physical photographic medium.

97. The image distribution system of claim 94,
wherein said physical photographic medium is paper.

98. The method of claim 95,
wherein said physical photographic medium is paper.

99. The business method of claim 96,
wherein said physical photographic medium is paper.

100. The system of claim 1, wherein the specific characteristic relates to a particular person.

\* \* \* \* \*